(12) United States Patent
Haubennestel et al.

(10) Patent No.: US 8,492,499 B2
(45) Date of Patent: *Jul. 23, 2013

(54) ADDITION COMPOUNDS AS DISPERSANTS AND DISPERSION STABILIZERS

(75) Inventors: Karlheinz Haubennestel, Wesel (DE); Stefan Moessmer, Wesel (DE); Wolfgang Pritschins, Wesel (DE); Thomas Launag, Voerde (DE)

(73) Assignee: BYK-Chemie GmbH (DE)

(*) Notice: Subject to any disclaimer, the term of this patent is extended or adjusted under 35 U.S.C. 154(b) by 474 days.

This patent is subject to a terminal disclaimer.

(21) Appl. No.: 11/725,978

(22) Filed: Mar. 20, 2007

(65) Prior Publication Data

US 2007/0259120 A1 Nov. 8, 2007

(30) Foreign Application Priority Data

Mar. 22, 2006 (DE) .................. 10 2006 012 999

(51) Int. Cl.
C08G 18/00 (2006.01)

(52) U.S. Cl.
USPC ............ 528/52; 528/45; 528/53; 528/67; 528/73; 560/26; 560/25; 560/27; 560/29; 560/33; 560/115; 560/158; 560/159; 560/160; 560/165; 560/166; 540/200; 540/202; 548/950; 548/951; 548/952

(58) Field of Classification Search
USPC .... 524/315, 361, 376, 507, 589, 590; 528/61, 528/71, 45, 49, 62, 63, 64, 68, 67, 73, 59; 548/950, 951, 952; 540/200, 202, 355; 560/26, 560/27, 29, 33, 115, 158, 159, 160, 165, 560/166
See application file for complete search history.

(56) References Cited

U.S. PATENT DOCUMENTS

| | | | |
|---|---|---|---|
| 2,957,852 A | 10/1960 | Frankenburg et al. | |
| 3,489,744 A | 1/1970 | Schwarez et al. | |
| 3,793,238 A * | 2/1974 | Winkelmann et al. | 264/216 |
| 3,998,794 A | 12/1976 | Muller et al. | |
| 4,042,413 A | 8/1977 | Hauxwell et al. | |
| 4,044,171 A * | 8/1977 | Muller et al. | 427/485 |
| 4,157,266 A | 6/1979 | Hauxwell et al. | |
| 4,163,749 A | 8/1979 | Hauxwell et al. | |
| 4,166,066 A | 8/1979 | Hauxwell et al. | |
| 4,451,656 A | 5/1984 | Dietz et al. | |
| 4,647,647 A | 3/1987 | Haubennestel et al. | |
| 4,735,984 A | 4/1988 | Gouji et al. | |
| 4,762,752 A | 8/1988 | Haubennestel et al. | |
| 4,795,796 A | 1/1989 | Haubennestel et al. | |
| 5,399,294 A | 3/1995 | Quednau | |
| 5,425,900 A | 6/1995 | Quednau | |
| 5,756,637 A * | 5/1998 | Brodt et al. | 528/71 |
| 5,852,111 A * | 12/1998 | Watanabe et al. | 524/839 |
| 5,861,193 A * | 1/1999 | Goldstein et al. | 427/385.5 |
| 5,910,556 A * | 6/1999 | Wamprecht et al. | 528/49 |
| 6,384,175 B1 | 5/2002 | Danielmeier et al. | |
| 6,451,963 B1 | 9/2002 | Langel et al. | |
| 7,652,166 B2 * | 1/2010 | Haubennestel et al. | 560/25 |
| 7,655,815 B2 * | 2/2010 | Haubennestel et al. | 560/158 |
| 8,362,300 B2 | 1/2013 | Pritschins et al. | |
| 2005/0250927 A1 * | 11/2005 | Pritschins et al. | 528/44 |
| 2007/0225451 A1 | 9/2007 | Haubennestel et al. | |

FOREIGN PATENT DOCUMENTS

| | | |
|---|---|---|
| CA | 2581016 | 0/9200 |
| CN | 1312329 A | 9/2001 |
| CN | 1692975 A | 11/2005 |
| DE | 1051862 | 3/1959 |
| DE | 1051862 B | 3/1959 |
| DE | 1110722 | 7/1961 |
| DE | 1110722 B | 7/1961 |
| DE | 2310048 C2 | 9/1973 |
| DE | 3641581 C3 | 6/1988 |
| EP | 0074080 B1 | 3/1983 |
| EP | 0136411 A1 | 4/1985 |
| EP | 0154678 A1 | 9/1985 |
| EP | 0191915 A1 | 8/1986 |
| EP | 0292702 A1 | 11/1988 |
| EP | 0438836 A1 | 7/1991 |
| EP | 0826753 A1 | 3/1998 |
| EP | 1593700 A1 | 11/2005 |
| EP | 1710228 A2 | 10/2006 |
| EP | 1832573 A2 | 9/2007 |
| JP | 61176625AA | 8/1986 |

OTHER PUBLICATIONS

USDA Nutrient Database for Standard Reference, Release 11, Coconut Oil NDB No. 04047, (Sep. 1996).
"ALIPA—Polyisocyanates", www.alipa.org/78.0.html, Copyright 2005 by Alipa, Brussels, Belgium, 2 pages.
Woods, G., The ICI Polyurethanes Book, 2d Ed., John Wiley & Sons, Nov. 1990; ISBN-10: 0471926582; ISBN-13: 978-047196580, (Nov. 1990), p. 30.
European Application Serial No. 07005744.3, Communication dated Jan. 13, 2011, 4 pgs.
European Application Serial No. 07005744.3, European Search Report dated Jan. 25, 2008, 11 pgs.

(Continued)

Primary Examiner — Michael L Leonard
(74) Attorney, Agent, or Firm — Schwegman Lundberg & Woessner, P.A.

(57) ABSTRACT

The invention relates to addition compounds which are obtainable by reacting
a) one or more polyisocyanates containing uretdione groups with
b) one or more compounds of the formula (I)

$$Y-(XH)_n \quad (I)$$

with the proviso that at least 50% of the free isocyanate groups of component a) are reacted with the compounds of the formula (I) to give an intermediate which contains uretdione groups, and subsequently the intermediate is reacted with
c) one or more compounds of the general formula (II)

$$Z-NHR_m \quad (II)$$

with the proviso that all free NCO groups optionally still present and at least 20% of uretdione groups originally used are reacted with $Z-(NHR)_m$. The invention further relates to the use of the addition compounds as dispersants and dispersion stabilizers, and to a process for preparing them.

15 Claims, No Drawings

OTHER PUBLICATIONS

European Application Serial No. 07005744.3, Response filed Dec. 9, 2008, 21 pgs.

Beyer, H., et al., *Lehrbuch der organischen Chemie*, S. Hirzel Verlag Stuttgart, (1984), p. 248.

Streitwieser, A., et al., "Chapter 19.6—Hydrolyse: Nucleophiler Additions-Eliminierungs-Mechanismus", *Organische Chemie*, VCH Velagsgesellschaft mbH, (1994), p. 531.

U.S. Appl. No. 11/123,804, Advisory Action mailed Jun. 30, 2009, 4 pgs.

U.S. Appl. No. 11/123,804, Advisory Action mailed Aug. 16, 2010, 3 pgs.

U.S. Appl. No. 11/123,804, Advisory Action mailed Sep. 9, 2010, 3 pgs.

U.S. Appl. No. 11/123,804, Examiner Interview Summary mailed Sep. 23, 2010, 4 pgs.

U.S. Appl. No. 11/123,804, Final Office Action mailed Apr. 14, 2009, 12 pgs.

U.S. Appl. No. 11/123,804, Final Office Action mailed Jun. 10, 2010, 11 pgs.

U.S. Appl. No. 11/123,804, Non Final Office Action mailed Mar. 25, 2011, 5 pgs.

U.S. Appl. No. 11/123,804, Non Final Office Action mailed Aug. 19, 2011, 7 pgs.

U.S. Appl. No. 11/123,804, Non Final Office Action mailed Dec. 18, 2006, 6 pgs.

U.S. Appl. No. 11/123,804, Non-Final Office Action mailed Jul. 9, 2008, 13 pgs.

U.S. Appl. No. 11/123,804, Non-Final Office Action mailed Sep. 10, 2007, 9 pgs.

U.S. Appl. No. 11/123,804, Non-Final Office Action mailed Nov. 2, 2009, 15 pgs.

U.S. Appl. No. 11/123,804, Notice of Non Compliant Amendment mailed Apr. 2, 2008, 4 pgs.

U.S. Appl. No. 11/123,804, Preliminary Amendment filed May 6, 2005, 3 pgs.

U.S. Appl. No. 11/123,804, Response filed Jan. 7, 2009 to Non-Final Office Action mailed Jul. 9, 2008, 25 pgs.

U.S. Appl. No. 11/123,804, Response filed Jan. 10, 2008 to Non-Final Office Action mailed Sep. 10, 2007, 12 pgs.

U.S. Appl. No. 11/123,804, Response filed Mar. 2, 2010 to Non Final Office Action mailed Nov. 2, 2009, 27 pgs.

U.S. Appl. No. 11/123,804, Response filed Apr. 8, 2008 to a Notice of Non Compliant mailed Apr. 2, 2008, 9 pgs.

U.S. Appl. No. 11/123,804, Response filed Jun. 3, 2011 to Non Final Office Action mailed Mar. 25, 2011, 14 pgs.

"U.S. Appl. No. 11/123,804, Response filed Jun. 15, 2007 to Non Final Office Action mailed Dec. 18, 2006", 14 pgs.

"U.S. Appl. No. 11/123,804, Response filed Jun. 15, 2009 to Final Office Action mailed Apr. 14, 2009", 19 pgs.

"U.S. Appl. No. 11/123,804, Response filed Aug. 4, 2010 to Final Office Action mailed Jun. 10, 2010", 23 pgs.

"U.S. Appl. No. 11/123,804, Response filed Aug. 13, 2009 to Advisory Action mailed Jun. 30, 2009", 20 pgs.

"U.S. Appl. No. 11/123,804, Response filed Aug. 25, 2010 to Final Office Action mailed Jun. 10, 2010", 22 pgs.

"U.S. Appl. No. 11/123,804, Response filed Dec. 9, 2010 to Final Office Action mailed Jun. 10, 2010", 11 pgs.

"U.S. Appl. No. 11/123,804, Response Filed Dec. 19, 2011 to Non Final Office Action -nailed Aug. 19, 2011", 15 pgs.

U.S. Appl. No. 11/123,804, Advisory Action mailed Jun. 29, 2012, 3 pgs.

U.S. Appl. No. 11/123,804, Examiner Interview Summary mailed May 14, 2012, 3 pgs.

U.S. Appl. No. 11/123,804, Examiner Interview Summary mailed Jul. 9, 2012, 3 pgs.

Appl. No. 11/123,804, Final Office Action mailed Apr. 26, 2012, 7 pgs.

U.S. Appl. No. 11/123,804, Notice of Allowance mailed Sep. 19, 2012, 7 pgs.

U.S. Appl. No. 11/123,804, Response filed Jun. 22, 2012 to Final Office Action mailed Apr. 26, 2012, 20 pgs.

U.S. Appl. No. 11/123,804, Response filed Jul. 20, 2012 to Final Office Action mailed Apr. 26, 2012, 21 pgs.

"European Patent Application No. 1832573, Derwent and Inpadoc patent family information", (Jan. 21, 2010), 23 pgs.

* cited by examiner

ADDITION COMPOUNDS AS DISPERSANTS AND DISPERSION STABILIZERS

RELATED APPLICATIONS

This application claims priority under 35 U.S.C. 119 to German Application No. 10 2006 012 999.7, filed Mar. 22, 2006, which application is incorporated herein by reference and made a part hereof.

The present invention relates to addition compounds suitable as dispersants and as dispersion stabilizers, and to the salts of the said compounds. The invention further relates to processes for preparing these addition compounds, to their use as dispersants and dispersion stabilizers for organic and inorganic pigments and also fillers in organic and aqueous systems, and to pulverous or fibrous solids coated with such dispersants and intended for incorporation into liquid systems.

Dispersants are suitable in general for stabilizing particulate solids in binders, paints, pigment pastes, plastics and plastics blends, for reducing the viscosity of such systems, and for improving the flow properties.

In order to be able to incorporate solids into liquid media, high mechanical forces are necessary. It is usual to use dispersants in order to lower the dispersing forces and in order to minimize the total input into the system of energy needed to deflocculate the particulate solids, and hence also to minimize the dispersing time. Dispersants of this kind are surface-active substances of anionic, cationic or neutral structure. These substances, in a small amount, are either applied directly to the solid or added to the dispersing medium. It is also known that, following complete deflocculation of the agglomerated solids into primary particles, after the dispersing operation, there are also instances of reagglomeration, thereby completely or partly nullifying the dispersing effort. As a consequence of the inadequate dispersing and/or as a result of reagglomeration there are unwanted effects: viscosity increase in liquid systems, shade drift and losses of gloss in paints and coatings, and the reduction of mechanical strength in plastics.

A multiplicity of different substances are nowadays used as dispersants for pigments and fillers. Besides simple compounds of low molecular mass, such as lecithin, fatty acids and their salts, and alkylphenol ethoxylates, for example, complex structures, too, are used as dispersants. Besides carboxy-functional compounds, such structures especially include amino-functional and amide-functional systems, which find broad use within the dispersants. In EP 158 406 and EP 208 041 use is made, for example, for the purpose of dispersing pigments, of amino- and amide-functional poly- and oligocopolymers based on polyamines and polycaprolactones, in which all the reactive amino groups have been converted into amide groups.

These products, however, constitute complex reaction mixtures which are difficult to reproduce and have very poor solubilities in solvents and inadequate compatibilities with binders and other resins. EP 0 713 894 describes the use of amino-functional polylactones for coatings and printing inks. Moreover, amine-functional polyacrylates (EP 0 311 157) are used for stabilizing organic and inorganic pigments.

Polymeric neutral dispersants based on polyurethanes are described for example in EP 1 453 875 and as dispersants comprise linear, in some cases chain-extended polyurethanes which are obtained by reacting diisocyanates with oligooxyalkylene monoalcohols and, where appropriate, with diols and/or diamines. U.S. Pat. No. 6,509,409 recites adducts of polyisocyanates with poly(oxyalkylenecarbonyl) units deriving from ε-caprolactone and δ-valerolactone as dispersants for paints and printing inks. WO 99/41320 A1 discloses inkjet inks which as dispersants comprise linear polyurethanes having, for example, polyoxyalkylene oxide units, which may terminally carry acid-functional groups.

EP 0 741 156 A1 describes the preparation of hydroxy-functional polyurethane-polyureas and their use as dispersants.

Patent EP 0 270 126 describes addition compounds as dispersants and dispersion stabilizers having non-basic attachment groups, obtainable by reacting polyiso-cyanates with hydroxy compounds and compounds containing Zerewitinoff hydrogen, and also at least one compound containing acidic functional moiety, hydroxy or alkoxysilyl group. Moreover, basic dispersants based on polyisocyanates are described for example in EP 0 154 678, EP 318 999 and EP 0 438 836. These products are prepared by addition reaction of monohydroxy compounds, diisocyanate-functional compounds and compounds having a tertiary amino group with the extant NCO groups of polyisocyanates containing isocyanurate, biuret, urethane and/or allophanate groups. EP 0 826 753 describes adducts based on polyisocyanates having a functionality of between 1.7 and 2.5 with monohydroxy compounds, compounds containing a tertiary amino group, and difunctional or trifunctional compounds, the NCO groups that are present after the reaction being consumed by secondary reactions down to a residual level of not more than 1.0% by weight, the secondary reactions being dimerization and trimerization reactions. Because of many possible side reactions in the course of their preparation, however, these systems constitute highly complex and poorly defined reaction mixtures, with the attendant disadvantages, such as greatly restricted compatibilities and poor solubilities. The reaction of the NCO groups with amine-containing compounds, in particular, represents a reaction step which is difficult to manage and which frequently leads to unwanted crosslinking and to formation of gel, since these crosslinking reactions are catalysed by amines, especially tertiary amines. Consequently these reactions can be carried out only in highly dilute solutions, and the end products have very low solids contents, of generally below 50% and in many cases even only 20-30%. The large amounts of solvent that are introduced via these products, as a result, lead to considerable problems in modern coating systems, however, since, in the course of the progressing efforts to produce environmentally compatible systems, it is necessary to lower the amount of solvent as far as possible (in the case, for example, of pigment concentrates, high-solid and ultra-high-solid coating materials), or even to dispense with organic solvents entirely. The last point is of particular importance, since for reasons of environmental burdening organic solvents have become increasingly unattractive and, consequently, substantial VOC-freedom is desired (VOCs=volatile organic compounds). The intermediates obtained by these processes are not storable for long periods, owing to the reactive NCO groups that are still always present, and must in general be reacted further immediately, thereby ruling out the possibility of the economically desirable holding of precursors in stock. EP 1 593 700 describes addition compounds without the above disadvantages, which are obtainable through the reaction of polyisocyanates containing uretdione groups, in a first step, with isocyanate-reactive compounds. In a second reaction step the uretdione groups are reacted in a targeted way with amines or polyamines containing tertiary amine units, any amino groups that are still reactive after this reaction being reacted with compounds that are reactive towards amino groups, in a subsequent reaction. These compounds are notable for increased storage stability on the part of the intermediates, since after the first reaction there are no longer any free NCO groups present. Nevertheless, dispersants which contain tertiary amino groups or, generally, basic groups may be disadvantageous in certain fields of application in which such moieties may lead to instances of interaction with the surrounding medium: for example, they may reduce the storage stability of two-component polyurethane systems by accelerating reaction or by boosting the breakdown of polyvinyl chloride polymer under thermal loads, or may delay curing by neutralizing acidic catalysts in acid-catalysed systems such as melamine-crosslinked coatings, as for example in the case of coil-coating applications based on polyester/melamine or alkyd/melamine.

The dispersants presented above often represent only partial solutions to these problems. In view of the multiplicity of organic and inorganic pigments and filling materials that are used today, sufficient stabilization of the particulate solids to be dispersed, by desorption-stable occupancy of the surface, is not adequately ensured. Consequently there are instances of agglomeration, since the efficient steric shielding that is necessary is lacking.

The present invention is therefore based on the object of eliminating the above-described disadvantages of known dispersants, in other words of developing dispersing additives which, while effectively stabilizing pigments or fillers, lower the millbase viscosity of the paints, pastes or plastics formulations to an extent such that processing with a high degree of filling is possible. At the same time, especially in the case of pigment pastes and filler pastes, a broad compatibility must be ensured, so that they can be used in many different binders and coating materials. Furthermore, it is necessary for the dispersing additives of the invention that are used to allow the pastes, or the binders prepared with these pastes, to be mixed with one another without flocculation.

Surprisingly it has become apparent that a marked improvement in the dispersing and stabilizing of pigments or filler particles in binders, pigment pastes or plastics formulations can be achieved if the addition compounds described below are used that are prepared from polyisocyanates containing uretdione groups.

These dispersants, furthermore, are of surprisingly broad compatibility and can be used both in polar and in apolar binder systems. They strongly lower the viscosity of the millbase during dispersing and so make it possible to prepare formulations having a high solids fraction.

It has surprisingly been found that the objective has been achieved through the provision of addition compounds which are obtainable by reacting
a) one or more polyisocyanates containing uretdione groups with
b) one or more compounds of the formula (I)

$$Y—(XH)_n \qquad (I)$$

where
XH is a group that is reactive towards isocyanates and
Y is a monomeric or polymeric organic group that is not reactive towards isocyanates and that comprises one or more aliphatic, cycloaliphatic, araliphatic and/or aromatic groups,
Y possessing a number-average molar mass of less than 20 000 g/mol, and
n is 1, 2 or 3, and
for at least 50 mol % of the compounds of the formula (I) it is the case that n=1, with the proviso that at least 50% of the free isocyanate groups of component a) are reacted with the compounds of the formula (I) to give an intermediate which contains uretdione groups,
and subsequently the intermediate is reacted with
c) one or more compounds of the general formula (II)

$$Z—(NHR)_m \qquad (II)$$

in which
R is hydrogen, an aliphatic, cycloaliphatic, araliphatic and/or aromatic radical having up to 36 C atoms, or a polyoxyalkylene radical,
m is 1, 2 or 3 and
Z is a non-basic aliphatic, cycloaliphatic, araliphatic and/or aromatic radical and/or polyoxyalkylene or polysiloxane radical having a number-average molar mass of less than 10 000 g/mol, which if desired may contain the following functional groups:
—OH
—COOH
—SO$_3$H
—PO$_3$H$_2$
—Si(OR)$_3$ and —SiR(OR)$_2$
where the hydroxyl groups are reacted if desired with polyphosphoric acid or P$_2$O$_5$ or with polycarboxylic acids having at least two carboxyl groups or their anhydrides in an amount such that for each OH group to be reacted there is at least 0.8 molecule of polycarboxylic acid or polycarboxylic anhydride employed;
and also salts of the addition compounds with the proviso that all free NCO groups that may still be present and at least 20% of the uretdione groups used originally are reacted with Z—(NHR)$_m$.

The addition compounds of the invention that are described here can be prepared targetedly and with fewer by-products than customary products known from the prior art, such as from EP 0 154 678, for example, and contain no tertiary amine moieties. The intermediates prepared in the first reaction step preferably no longer contain free NCO groups and are therefore storage-stable for as long as desired, which makes more economic preparation possible. In particular the reaction with the amino-functional compounds Z—NHR proceeds without unwanted crosslinking, since in this case there are preferably no free NCO groups present.

Polyisocyanates Containing Uretdione Groups (Component (a))

For the preparation of the addition compounds according to the invention use is made as uretdione-containing polyisocyanates (component a)) of the prior art compounds known in this technical field, as are described, for example, as starting compounds in EP 0 795 569. The preparation of these uretdione polyisocyanates is described for example in DE 1 670 720, EP 45 995, EP 99 976, EP 1 174 428 and the references cited therein. Preferably these polyisocyanates possess an average functionality of 2. With particular preference they include cyclic dimerization products of 1,4-diisocyanatobutane, hexa-methylene diisocyanate (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclo-hexane, 1,3- and 1,4-bis(isocyanatomethyl)cyclohexane, 1-isocyanato-3,3,5-trimethyl-5-isocyanatomethylcyclo-hexane (isophorone diisocyanate, IPDI), 4,4'-diiso-cyanatodicyclohexylmethane, tolylene diisocyanate (TDI), 1-isocyanato-1-methyl-4(3)-isocyanatomethyl-cyclohexane, bis(isocyanatomethyl)norbornane and 1,3- and 1,4-bis(2-isocyanatoprop-2-yl)benzene (TMXDI) or mixtures of such diisocyanates. Especially preferred are cyclic dimerization products of hexamethylene diisocyanate (HDI), available commercially as Desmodur® N 3400 from BAYER, of isophorone diisocyanate (IPDI) or of tolylene diisocyanate (TDI), available for example as Desmodur® TT/G from Rhein-Chemie.

These compounds are commercial products, which frequently are not present in pure form but instead represent the mixtures of compounds of similar structure. By "average functionality of 2" is meant that in terms of selected radicals the commercial products have on average the stated functionality of 2. "Functionality of 2" means, for example, that one molecule containing isocyanate groups contains on average 2 free isocyanate groups. The average functionality can be determined experimentally by determining the number-average molecular weight Mn. Additionally, the NCO number is determined and from this the NCO equivalent weight is calculated. The average functionality is the ratio formed from the number-average molecular weight and the NCO equivalent weight.

The polyisocyanates containing uretdione groups (component a)) are reacted in accordance with the invention with compounds of the above formula (I) (component b)).

Compounds of the Formula (I) (Component (b))

The compounds of the formula (I) are characterized in that they contain one, two or three isocyanate-reactive groups XH. Examples of XH are —OH, —NH$_2$, —NHR, —SH or —COOH. Preferably XH is —OH, —NH$_2$ or —NHR. With particular preference these functional groups are hydroxyl groups, since those compounds are easily accessible and/or available commercially. The reaction products obtained are also usually highly soluble in solvents of the kind employed in the subsequent use of the addition compounds according to the invention.

As compounds of the formula (I) it is possible to use aliphatic, cycloaliphatic, araliphatic and/or aromatic compounds. It is also possible to use mixtures of such compounds. Straight-chain and branched aliphatic or araliphatic compounds can be used. These compounds may be saturated or unsaturated. Saturated compounds are preferred. Some of the hydrogen atoms may have been replaced by halogen atoms, preferably by fluorine and/or chlorine.

Examples of compounds of the formula (I) are straight-chain or branched alcohols such as methanol, ethanol, butanol, ethylhexanol, decanol, isotridecyl alcohol, lauryl alcohol, stearyl alcohol, isobornyl alcohol, benzyl alcohol, propargyl alcohol, oleyl alcohol, linoleyl alcohol, oxo alcohols, neopentyl alcohol, cyclohexanol, fatty alcohols, alkylphenols, monophenyl diglycol, alkylnaphthols, phenylethanol, hydroxyl-functional vinyl compounds such as, for example, hydroxybutyl vinyl ether, hydroxy-functional acrylates or methacrylates such as, for example, hydroxyethyl acrylate, hydroxyethyl methacryate, hydroxybutyl (meth)acrylate, hydroxyethylpyrrolidine and hydroxyl-ethylethyleneurea, and also polyolefin polyols, such as unhydrogenated or hydrogenated, hydroxy-functional polybutadienes, polypropylenes, ethylene/butylene co-polymers or polystyrenes having an average functionality of 1 to 3. Examples of corresponding commercial products are the hydroxy-terminated hydrogenated polybutadienes, available under the name Polytail® from Mitsubishi Chemical, or the hydroxy-terminated ethylene/butylene copolymers Kraton® Liquid L-1203, L-1302 and L-2203 from Kraton Polymers, or the liquid polybutadienes available as NISSO-PB from Nippon Soda Co., or the saturated, long-chain, linear, largely primary alcohols available from Baker Petrolite as Unilin® alcohols, having chain lengths of up to C50 and molecular weights of 375 to 700, and their ethoxylates, which are obtainable under the Unithox® name. Further examples are described inter alia in EP-A-154 678.

As compounds of the formula (I) it is also possible to use those which contain ester, ether, urethane, carbonate and/or siloxane groups or combinations of these groups. They may therefore, for example, be polyethers, polyesters, polyurethanes, polycarbonates, polysiloxanes, or, for example, mixed polyether-polyesters.

Polyesters can be prepared for example by reacting dicarboxylic acids, dicarboxylic anhydrides and/or dicarbonyl chlorides with diols and mono-, di- or tri-functional starter components. The formation of dihydroxy polyesters can be suppressed if required by using correspondingly stoichiometric amounts of monohydroxy compounds, as have been described above.

Preferred polyesters of the formula (I) are polyesters which can be obtained by polymerizing one or more, optionally alkyl-substituted, hydroxy carboxylic acids and/or lactones thereof such as propiolactone, valerolactone or caprolactone, for example, by means of a mono-, di- or tri-hydroxy starter component, as described in EP-A-154 678 (U.S. Pat. No. 4,647,647). Preferably they possess a number-average molecular weight Mn of 150 to 5000 g/mol. As a starter component it is possible in principle to use any compounds other than those given as compounds of the formula (I). The mono-, di- or tri-functional alcohols used as starter components possess preferably 1 to 30, more preferably 4 to 14, carbon atoms. Mentioned by way of example are n-butanol, longer-chain, saturated and unsaturated alcohols, such as propargyl alcohol, oleyl alcohol, linoleyl alcohol, oxo alcohols, cyclohexanol, phenylethanol, neopentyl alcohol, ethylene glycol, propylene glycol, glycerol, and also fluorinated alcohols, hydroxy-functional polydialkylsiloxanes, hydroxy-functional vinyl compounds such as, for example, hydroxybutyl vinyl ether, hydroxy-functional acrylates or methacrylates such as, for example, hydroxyethyl acrylate, hydroxyethyl methacryate, hydroxybutyl (meth)acrylate, hydroxy-functional polyalkylene glycol acrylates and methacrylates. It is also possible to convert alcohols of the above-described kind and substituted and unsubstituted phenols, by alkoxylation in accordance with known processes, using alkylene oxides such as, for example, ethylene oxide, propylene oxide, butylene oxide and/or styrene oxide, into polyoxyalkylene monoalkyl, polyoxyalkylene monoaryl, polyoxyalkylene monoaralkyl and polyoxyalkylene monocycloalkyl ethers and to use these hydroxy polyethers in the manner described above as starter components for the lactone polymerization. In each case it is also possible to use mixtures of aforementioned compounds. The lactone polymerization is carried out by known methods, initiated by p-toluenesulphonic acid or dibutyltin dilaurate, for example, at temperatures of about 70° C. to 180° C. Particular preference is given to polyesters based on ε-caprolactone, in combination if desired with δ-valerolactone.

As compounds of the formula (I) it is also possible to use mono-, di- or tri-hydroxy polyethers. These can be obtained, for example, by alkoxylating the other compounds described as compounds of the formula (I), such as alkanols, cycloalkanols, phenols or the above-described hydroxy polyesters with alkylene oxides such as ethylene oxide, propylene oxide, butylene oxide, styrene oxide or mixtures thereof. Mixed polyethers may be arranged randomly or in blocks. Preference is given to polyethers based on ethylene oxide, propylene oxide and mixtures thereof. Preferred are monohydroxy-functional polyoxyalkylene monoalcohols such as allyl polyethers, for example Polyglycol A 350, Polyglycol A 500, Polyglycol A 1100, Polyglycol A 11-4, Polyglycol A 20-10 or Polyglycol A 20-20 from Clariant AG or Pluriol® A 010 R, Pluriol® A 11 RE, Pluriol® A 13 R, Pluriol® 22 R or Pluriol® A 23 R from BASF AG, vinyl polyethers, for example Polyglycol V 500, Polyglycol V 1100 or Polyglycol V 5500 from Clariant AG, polyoxyethylene monoalcohols prepared starting from methanol, such as Pluriol® A 350 E, Pluriol® A 500 E, Pluriol® A 750 E, Pluriol® A 1020 E, Pluriol® A 2000 E or Pluriol® A 5010 E from BASF AG, polyoxypropylene monoalcohols prepared starting from alkanol, such as Polyglycol B01/20, Polyglycol B01/40, Polyglycol B01/80, Polyglycol B01/120 or Polyglycol B01/240 from Clariant AG or Pluriol® A 1350 P or Pluriol® A 2000 P from BASF AG, and polyalkoxylates started using different fatty alcohols and having a variable degree of alkoxylation, of the kind known to the skilled worker under the trade names Lutensol® A, Lutensol® AT, Lutensol® AO, Lutensol® TO, Lutensol® XP, Lutensol® XL, Lutensol® AP and Lutensol® ON from BASF AG. Preference is given to using polyoxyalkylene monoalcohols which contain ethylene oxide and/or propylene oxide and/or butylene oxide groups and which may have been modified with styrene oxide. Particular preference is given to using polyoxyalkylene monoalcohols such as, for example, Polyglycol B 11/50, Polyglycol B 11/70, Polyglycol B 11/100, Polyglycol B 11/150, Polyglycol B 11/300 or Polyglycol B 11/700 from Clariant AG, Pluriol® A 1000 PE, Pluriol® A 1320 PE, or Pluriol® A 2000 PE from BASF AG or Terralox WA 110 from DOW Chemicals, which are polyoxyalkylenes prepared starting from alkanol, formed from ethylene oxide and propylene oxide, and with a terminal OH group.

As compounds of the formula (I) it is also possible to use polyurethanes, polyether-polyurethanes, polyester-polyurethanes and/or polyether-polyester-polyurethanes, which can be obtained by addition reaction of diisocyanates with dihydroxy compounds in the presence of mono-, di- or tri-functional starter components.

Preferred compounds of the formula (I) are hydroxy-functional polyethers, hydroxy-functional polyesters, hydroxy-functional polyether-polyesters and/or aliphatic and/or cycloaliphatic alcohols having 2 to 30 carbon atoms, some of whose hydrogen atoms may have been replaced by halogen and/or aryl radicals.

As compounds of the formula (I) it is also possible to use mono-, di- or tri-functional polysiloxanes such as, for example, amino- or hydroxy-functional polydialkyl-siloxanes containing hydroxyl groups not attached to silicon atoms, or to use aminoalkylpolysiloxanes, which where appropriate may have been polyether-modified and/or polyester-modified. It is preferred to use hydroxyalkylpolydimethylsiloxanes having number-average molecular weights Mn of advantageously 400 to 8000, preferably up to 5000 g/mol and more preferably up to 2000 g/mol.

As a diisocyanate for synthesizing the compounds of formula (I) that contain urethane groups it is possible to use the aliphatic, cycloaliphatic and/or aromatic diisocyanates known per se from polyurethane chemistry and having 4 to 15 carbon atoms, such as tetramethylene, hexamethylene, trimethylhexamethylene, dodecamethylene, isophorone, tolylene and diphenyl-methane diisocyanates, methylenebis(4-cyclohexyl iso-cyanate) or 1,4-cyclohexanebis(methyl isocyanate). As hydroxy compounds for synthesizing the compounds of formula (I) that contain urethane groups it is appropriate to use diols having 2 to 12 carbon atoms, polyoxyalkylene glycols and dihydroxy-functional polyesters having preferred number-average molecular weights of not more than 2000 g/mol. As monohydroxy-functional starter component it is possible to use alcohols having up to 30 carbon atoms, such as are described for preparing the polyesters of formula (I), but also the hydroxy polyesters and hydroxy polyethers that are described as a compound of formula (I). The polyesters possess preferably a number-average molecular weight of 300 to 5000 g/mol, and the polyethers from 200 to 2000 g/mol.

The radical Y can contain carbonate groups such as are obtained by reaction with open-chain and/or cyclic carbonates in accordance with the prior art. Suitability is possessed for example by carbonate-modified linear polyesters or polycarbonate diols such as are used in preparing polyurethane. Examples are described in U.S. Pat. No. 4,101,529, EP 0 358 555, or WO 02/085507. Suitable carbonates are, for example, aliphatic, cycloaliphatic, araliphatic and/or aromatic esters of carbonic acid, such as dialkyl carbonates such as dimethyl carbonate, diethyl carbonate or diphenyl carbonate, for example, catechol carbonate or cyclic alkylene carbonates. Particular suitability is possessed by cyclic alkylene carbonates having 5- or 6-membered rings, which if desired may be substituted. Preferred substituents are aliphatic, cycloaliphatic and/or aromatic groups having up to 30 carbon atoms. Examples of suitable cyclic alkylene carbonates are ethylene carbonate, propylene carbonate, glyceryl carbonate, trimethylene carbonate, 4-methyltrimethylene carbonate, 5-methyltrimethylene carbonate, 5,5-dimethyltrimethylene carbonate, 5,5-diethyltrimethylene carbonate or 5-methyl-5-propyltrimethylene carbonate.

The radical Y may contain heteroatoms such as O, S and/or N and may carry further groups which behave inertly during the formation of the adduct. Examples of such groups include the carboxamide group (—NHCO—), unactivated double bonds or urea groups (—NHCONH—). The fraction of these groups should preferably be below 50 mol %, more preferably below 5 mol %. Particularly preferred compounds are those containing none of these groups at all.

The ester, ether, urethane, carbonate and/or siloxane groups that may be present can be arranged in a block structure (e.g. poly(ethylene oxide-block-propylene oxide-block-e-caprolactone) or else randomly.

As a compound of the formula (I) it is also possible to use polyacrylic esters and/or polymethacrylic esters having on average up to three NCO-reactive groups, such as are obtained by anionic, cationic or free-radical polymerization of acrylic esters and/or methacrylic esters. Preference is given to monohydroxy-functional compounds. Monohydroxy-functional polyacrylic esters and polymethacrylic esters are those containing on average one hydroxyl group in the molecule. Such compounds have already been used in the present field of the art for preparing other dispersants. Compounds of this kind are described for example in U.S. Pat. No. 4,032,698 or EP 318 999. Such poly(meth)acrylates possess preferably a number-average molecular weight Mn of 300 to 20 000 g/mol, more preferably 500 to 10 000. They can be arranged in a block structure or else randomly.

The carboxyl group of the monomeric (meth)acrylates (the term (meth)acrylates stands for acrylates and methacrylates) can be esterified with, for example, aliphatic, cycloaliphatic and/or aromatic alcohols such as methanol, butanol, cyclohexanol, 2-ethylhexanol, lauryl, stearyl, isobornyl or benzyl alcohol or with ether alcohols such as 2-methoxyethanol, 2-phenoxy-ethanol, tetrahydrofurfuryl alcohol, glycidol or with polyester alcohols such as hydroxyl-functional polycaprolactone, or with alkoxypolyalkylene glycols such as methoxypolyethylene glycol or methoxypoly-propylene glycol. The number-average molecular weight Mn of the esterification component is preferably below 2000 g/mol. For preparing the hydroxy-functional poly(meth)acrylates it is also possible to use mixtures of different monomers described above. For preparing these poly(meth)acrylates it is also possible as comonomers to use vinyl esters such as vinyl acetate, vinyl ethers such as vinyl ethyl ether, styrene, vinyl-toluene and/or vinylcyclohexane. The resulting copolymers advantageously do not contain more than 50 mol % of comonomers that have no acrylic functionality.

Also possibly functioning as compound of the formula (I) are hydroxy-functional poly-2-alkyl-2-oxazolines or poly-2-alkyl-2-oxazines. Monohydroxy-functional compounds are used with preference. As the person skilled in the art is aware, poly-2-alkyl-2-oxazolines or poly-2-alkyl-2-oxazines are obtained by cationic, ring-opening polymerization of 2-alkyl-2-oxazolines or 2-alkyl-2-oxazines with initiators such as para-toluenesulphonic acid, methyl tosylate or methyl triflate, for example. The oxazolinium or oxazinium end groups that result from the living cationic polymerization mechanism can be converted by alkaline hydrolysis via amino ester end groups into the more stable hydroxy amides. An alternative route to the preparation of monohydroxy-functional poly-2-alkyl-2-oxazolines or poly-2-alkyl-2-oxazines is the polymerization with 2-(4-hydroxyphenyl)-N-methyl-2-oxazolinium trifluoromethanesulphonate as the initiating species (A. Groβ, G. Maier, O. Nuyken, Macromol. Chem. Phys. 197, 2811-2826 (1996)). Through the choice of the alkyl substituent it is possible to control the compatibility. For example, the water-solubility of poly-2-ethyl-2-oxazoline makes it suitable for highly polar systems, whereas poly-2-lauryl-2-oxazoline, for example, is compatible in apolar systems. Where block copolymers are formed from 2-ethyl-2-oxazoline and 2-lauryl-2-oxazoline, the polymers are notable for a broad compatibility. Such poly-2-alkyl-2-oxazolines or poly-2-alkyl-2-oxazines possess preferably a number-average molecular weight Mn of 300 to 20 000 g/mol, more preferably 500 to 10 000 g/mol.

The number-average molecular weight of a radical Y is smaller than 20 000 g/mol and is advantageously not more than 10 000 g/mol, preferably not more than 5000 g/mol, more preferably not more than 3500 g/mol, and very preferably not more than 2000 g/mol. The minimum molecular weight of Y is advantageously 100 g/mol, preferably 150 g/mol, more preferably 200 g/mol, and very preferably 400 g/mol. Advantageously less than 50 mol % of the compounds used, according to formula (I), ought to possess a number-average molecular weight of less than 100 g/mol, preferably less than 25 mol %, more preferably less than 15 mol % and very preferably 0 mol %.

In applications requiring a broad compatibility, as in the universal paste sector, for example, it is frequently advantageous to use addition compounds which are prepared with mixtures of different compounds of the formula (I). Where, for example, the addition compounds of the invention are to be used in universal tinting pastes for aqueous and apolar systems, the combination of water-soluble with apolar compounds of the formula (I) is an advantage.

In the reaction with the monofunctional compounds of the formula (I) 50 to 100 mol %, preferably 75 to 100 mol % and more preferably 100 mol % of the free NCO groups originally used are reacted.

Examples of di- or trifunctional compounds of the formula (I) (n=2 or 3) are diols and triols and, respectively, diamines, dialkanolamines and mono-alkanolamines having 2 to 12 carbon atoms, dihydroxy-dialkyl sulphides and dihydroxy sulphones. Examples are butanediol, hexanediol, cyclohexanedimethanol, neopentyl glycol, ethylene glycol, alkyl-substituted dialkanolamines, glycerol, trimethylolpropane, fatty acid dialkanol amides, thiodiglycol and di(4-hydroxy-phenyl) sulphone. One preferred group of compounds of the formula (I) are polyoxyalkylene glycols advantageously having alkylene groups having 2 to 4, preferably 2, carbon atoms, and preferably having number-average molecular weights in the range from preferably 200 to 2000 g/mol and more preferably 400 to 1500 g/mol. Ethoxylates with 3 hydroxyl groups are obtained, for example, by polymerization using trifunctional alcohols as a starter component. Preferred polyoxyalkylene glycols are polyethylene glycols.

As di- or tri-functional compounds of the formula (I) it is also possible to use those which can be obtained by polymerizing one or more lactones, as already mentioned, by means of di- or tri-hydroxy starter components. Preferably these polyesterpolyols have a number-average molecular weight Mn of 800 to 2000 g/mol. A preferred starter component is butanediol or ethylene glycol. It is also possible, however, for the abovementioned diols or triols to be suitable starter components.

As polyfunctional compounds of the formula (I) it is possible to use polyurethanes, polyether-polyurethanes, polyester-polyurethanes and/or polyether-polyester-polyurethanes, which can be obtained by addition reaction with a diisocyanate with a dihydroxy compound in analogy to the corresponding monofunctional compounds according to formula (I). Preferably these urethane-containing compounds according to formula (I) have an average functionality of not more than 2 and a number-average molecular weight of from 300 to 2500 g/mol, preferably of 500 to 1500 g/mol.

The di- or tri-functional compounds of the formula (I) produce crosslinking between the reaction products of polyisocyanate and monofunctional compounds of the formula (I). The starting products can be used for example in amounts such that the di- or trifunctional compounds of the formula (I) constitute the centre of the molecule, and such that attached to them are the polyisocyanates whose remaining isocyanate groups have been or are reacted with monofunctional compounds of the formula (I). It is of course also possible for a certain overcrosslinking or undercrosslinking to be present.

In the case of the reaction with the di- or tri-functional compounds of the formula (I) it is preferred to react 0% to 50% and preferably 0% to 25% of the NCO groups originally used. Particularly preferred products are obtained entirely without the use of di- or tri-functional compounds of the formula (I). In total at least 50%, preferably 70%, more preferably 80%, with particular preference 90% and very preferably 100% of the NCO groups originally used are reacted with the compounds of the formula (I).

The reaction of the polyisocyanates with different compounds of the formula (I) can be carried out in one single reaction step or in two or more reaction steps in succession. This can take place in any order. In many cases, however, it is advantageous to react the poly-isocyanate in succession with the components in the order first of monofunctional and then of polyfunctional compounds. The isocyanate addition can take place, depending on the reactivity of the individual reactants, within the temperature range that is customary for this kind of reaction, from room temperature up to about 150° C. For the purposes of acceleration and reduction of side reactions it is possible to use the customary prior art catalysts such as tertiary amines, for example triethylamine, di-methylcyclohexylamine, N-methylmorpholine, N,N'-dimethylpiperazine, 2-(dimethylaminoethoxy)ethanol, di-azabicyclo[2.2.2] octane and similar compounds, and also, in particular, organometallic compounds such as titanic esters, iron compounds such as iron(III) acetylacetonate, for example, tin compounds, such as tin diacetate, tin dioctoate, tin dilaurate or the dialkyl derivatives of tin dialkyl salts of aliphatic carboxylic acids such as dibutyltin diacetate, dibutyltin dilaurate or the like, for example. These catalysts are customarily used in amounts of 0.0001 to 0.1 part by weight per 100 parts by weight of isocyanate.

Compounds of the Formula (II) (Component (c))

Reaction of the free NCO groups of the polyisocyanates containing uretdione groups with the compounds of the formula (I) is followed by the addition reaction of one or more compounds of the formula (II) Z—(NHR)$_m$, by way of the reactive amino groups, with the uretdione groups and any free NCO groups still present. In the course of the reaction with the compounds of the formula (II), any free NCO groups that may still be present and at least 20%, preferably at least 50%, more preferably at least 80% and very preferably 100% of the uretdione groups originally used are reacted.

Depending on the reactivity of the compounds used this reaction is carried out preferably in a temperature range from about 20° C. to 200° C., more preferably from 60° C. to 150° C. It is possible here to add the uretdione to the initial amine charge. It is also possible to add the amine compound to the initial uretdione charge. The addition reaction can if desired be carried out in the presence of suitable catalysts, examples being amidines or Lewis acids. An overview of suitable catalysts is found for example in DE-198 56 878 and the references cited therein. Normally, however, it is unnecessary to use such catalysts. If there are other functional groups in the compounds Z—(NHR)$_m$, such as hydroxy or carboxy functionalities or phosphonic acid groups, for example, then under the stated reaction conditions these groups do not react, or react only very slowly, with the compounds containing uretdione groups, so that it is virtually exclusively the amine function which undergoes addition to the uretdione group, with retention of the hydroxy or carboxy function or phosphonic acid group.

A characteristic of the compounds Z—(NHR)$_m$ is that they contain per molecule at least one amino group having at least one Zerewitinoff hydrogen atom, which reacts preferentially with the uretdione rings, so that after the end of the reaction there are preferably no longer any free amino groups present, and, furthermore, that they contain no tertiary amino group. Any excess reactive primary or secondary amino groups that are still present after the reaction of the polymers containing uretdione groups with the compounds Z—(NHR)$_m$ can be reacted further in downstream reactions if desired, for the purpose of their use in systems where problems are likely from residual amine contents of this kind, such as discoloration or reduced pot life, such reactions being known in principle to the person skilled in the art, and taking place with compounds such as carboxylic acids, carboxylic anhydrides, isocyanates, acrylates, epoxy compounds, carbonates and/or α,β-unsaturated compounds, for example. R stands for hydrogen, an aliphatic, cycloaliphatic, araliphatic and/or aromatic radical having up to 36 C atoms, or a polyoxyalkylene radical, m is 1, 2 or 3, and Z is an aliphatic, cycloaliphatic, araliphatic and/or aromatic radical having a number-average molar mass of less than 10 000 g/mol which may optionally contain functional groups. Advantageously for at least 50 mol % of the compounds of the formula (II) m is 1, preferably for at least 75 mol % and with particular preference for 100%.

R can be hydrogen, a $C_1$-$C_{36}$ alkyl radical, which may be linear, branched, saturated or mono- to polyunsaturated, a $C_4$-$C_{36}$ cycloalkyl, a $C_6$-$C_{36}$ aryl or a $C_7$-$C_{36}$ aralkyl radical. Preferably R stands for hydrogen, a $C_1$-$C_{22}$ alkyl, a $C_5$-$C_{15}$ cycloalkyl, a $C_6$-$C_{18}$ aryl or a $C_7$-$C_{20}$ aralkyl radical, and with very particular preference for hydrogen, a $C_1$-$C_8$ alkyl, a $C_6$-$C_{12}$ aryl or a $C_7$-$C_{12}$ aralkyl radical.

Z can be a $C_1$-$C_{50}$ alkyl radical, preferably a $C_1$-$C_{36}$ alkyl radical, which may be linear, branched, saturated or mono- to polyunsaturated, a $C_4$-$C_{36}$ cycloalkyl, a $C_6$-$C_{36}$ aryl or a $C_7$-$C_{36}$ aralkyl radical. Preferably Z stands for a $C_1$-$C_{22}$ alkyl, a $C_5$-$C_{15}$ cycloalkyl, a $C_6$-$C_{18}$ aryl or a $C_7$-$C_{20}$ aralkyl radical, and with very particular preference for a $C_1$-$C_{18}$ alkyl, a $C_6$-$C_{12}$ aryl or a $C_7$-$C_{12}$ aralkyl radical.

Z also stands for a $C_2$-$C_{36}$ alkylene radical, which may be linear, branched, saturated or mono- to polyunsaturated, a $C_4$-$C_{36}$ cycloalkylene, a $C_6$-$C_{36}$ arylene or a $C_7$-$C_{36}$ aralkylene radical. Preferably Z stands for a $C_2$-$C_{18}$ alkylene, a $C_{12}$-$C_{18}$ alkenylene, a $C_5$-$C_{15}$ cyclo-alkylene, a $C_6$-$C_{18}$ arylene or a $C_7$-$C_{20}$ aralkylene radical. With very particular preference Z is a $C_2$-$C_{12}$ alkylene, a $C_6$-$C_{12}$ arylene or a $C_7$-$C_{12}$ aralkylene radical. Additionally Z may be a polytetrahydrofuran radical, a polyolefin radical, a polydimethylsiloxane radical or a polyoxyalkylene radical. The polyoxyalkylene radical is preferably composed of ethylene oxide and/or propylene oxide and/or butylene oxide groups, arranged randomly or blockwise, and has a number-average molecular weight of 148 to 10 000 g/mol, more preferably of 148 to 5000 g/mol.

One group of compounds which can be used as Z—(NHR)$_m$ with m=1 is composed of alkylamines, such as methylamine, ethylamine, n-propylamine, isopropylamine, n-butylamine, isobutylamine, amylamine, n-pentylamine, isopentylamine, hexylamine, 2-ethylhexylamine, octylamine, 6-methyl-2-heptaneamine, neopentylamine, decylamine, tridecylamine, octadecylamine, oleylamine, mixtures of $C_8$-$C_{22}$ alkylamines, as offered by Akzo Nobel in the form, for example, of Armeen® C or Armeen® M, and also secondary alkylamines, such as dimethylamine, diethylamine, di-n-propylamine, diisopropylamine, di-butylamine, diisobutylamine, di-sec-butylamine, di-pentylamine, diisopentylamine, dihexylamine, di-2-ethylhexylamine, dioctylamine, ditridecylamine, ditallowamine, N-methylbutylamine, N-ethylbutylamine, N-ethylisopropylamine or N-ethyl-1,2-dimethylpropyl-amine. Cycloaliphatic amines, such as cyclobutylamine, cyclopentylamine, cyclohexylamine, N-methylcyclohexyl-amine, N-ethylcyclohexylamine or dicyclohexylamine, are also used, as are araliphatic monoamines, such as benzylamine, 2-phenylethylamine, 4-methoxybenzylamine, 4-methoxyphenylethylamine, 1-methyl-3-phenyl-propylamine, 2-(3,4-dimethoxyphenyl) ethylamine, N-methylbenzylamine or dibenzylamine. The use of benzylamine and dibenzylamine is preferred. Alkoxyalkylamines, such as 2-methoxyethylamine, 2-ethoxyethylamine, 3-methoxypropylamine, 3-ethoxypro-pylamine, 3-(2-ethylhexoxy)propylamine, 3-(2-methoxy-ethoxy)propylamine and di(2-methoxyethyl)amine, may likewise be practised. Polyoxyalkylene monoamines which contain ethylene oxide and/or propylene oxide and/or butylene oxide groups, arranged randomly or blockwise, which if appropriate are modified with styrene oxide and which have an average molecular weight of 300 to 4000 g/mol, can likewise be employed. Compounds of this kind are known, for example, under the trade names Jeffamine® M 600, M 1000, M 2005 and M 2070 from Huntsman.

Another group of compounds which can be used as Z—(NHR)$_m$ with m=1 is composed of amines having one or more carboxy functions. Examples of aminocarboxylic acids of this kind are e.g. aminoacetic acid, 6-aminohexanoic acid, 7-aminoheptanoic acid, 11-aminoundecanoic acid, 12-aminododecanoic acid, anthranilic acid, 3-amino-phenylacetic acid, 4-aminophenylacetic acid, amino-naphthocarboxylic acid, 4-amino-2-hydroxybenzoic acid, preferably m-aminobenzoic acid and p-aminobenzoic acid. These compounds can also be used as mixtures.

Furthermore, compounds which find use as Z—(NHR)$_m$ with m=1 may be composed of amines with one or more sulphonic acid groups. Examples of compounds of this kind are e.g. 2-aminobenzenesulphonic acid, 3-aminobenzenesulphonic acid, 4-aminobenzenesulphonic acid, aminomethanesulphonic acid, 2-aminoethane-sulphonic acid, 3-aminopropanesulphonic acid, naphthyl-aminesulphonic acid and aminonaphthosulphonic acid. These compounds can also be used as mixtures.

Amine-functional phosphonic acids such as 4-amino-benzenephosphonic acid and 3-aminopropane-1-phosphonic acid, for example, may likewise be used as compounds Z—(NHR)$_m$ with m=1.

A further representative of compounds which find use as Z—(NHR)$_m$ with m=1 are amino hydroxy compounds such as, for example, 2-aminoethanol, 3-amino-1-propanol, 1-amino-2-propanol, 6-amino-1-hexanol, 2-(2-aminoethoxy)ethanol, N-methylethanolamine, N-ethylethanolamine, N-butylethanolamine, diethanolamine, 3-(2-hydroxyethylamino)-1-propanol, 1-amino-2,3propane-diol, 1-(methylamino)-2,3-propanediol and diisopropanolamine, and also their alkoxylated compounds with a terminal OH group. These compounds can also be used as mixtures.

These OH-containing compounds can be used without further reaction as dispersants, but it may also be sensible, in particular for the purpose of dispersing particular pigments whose surface is basic in nature, to react the OH groups so as to give a product containing acidic functional moieties. A conversion of this kind can be achieved by reacting the OH groups with an amount of dicarboxylic or polycarboxylic acids or their anhydrides such that crosslinking reactions are largely avoided. Crosslinking reactions during the addition reaction of polycarboxylic acids or their anhydrides with OH-functional compounds can be largely avoided, as the person skilled in the art is aware, by using at least 0.8 molecule, preferably 1 molecule, of polycarboxylic acid or polycarboxylic anhydride to each OH group to be reacted. A slight excess of polycarboxylic acid or polycarboxylic anhydride may be sensible in order to avoid crosslinking reactions. In general an excess of about 25, preferably 10 mol % is sufficient.

As co-reactants for an esterification reaction of this kind it is possible to use all of the polycarboxylic acids or polycarboxylic anhydrides that are useful according to the prior art for esterification reactions, such as, for example, succinic acid, maleic acid, fumaric acid, acetylenedicarboxylic acid, glutaric acid, adipic acid, 1,10-dodecanedicarboxylic acid, terephthalic acid, diglycolic acid, benzene-1,2,4-tricarboxylic acid, benzene-1,2,3,4-tetra-carboxylic acid, acetic anhydride, succinic anhydride, maleic anhydride, phthalic anhydride, tetrahydrophthalic anhydride, alkyltetrahydrophthalic anhydride, hexahydrophthalic anhydride, alkylhexahydrophthalic anhydride, trimellitic anhydride, 1,8-naphthalic anhydride, alkenyl- and/or alkyl-succinic anhydride with preferably 1 to 20 carbon atoms in the alkenyl or alkyl chains.

As is known to the person skilled in the art, the esterification reaction of an alcohol proceeds generally much more readily with a carboxylic anhydride than with the corresponding carboxylic acid. In the molar reaction of alcohols with the anhydrides of polycarboxylic acids, therefore, it is the anhydride groups which react preferentially, whereas the free carboxyl groups which are present or which form in the course of monoester formation are largely retained. This permits a selective reaction regime with substantial avoidance of crosslinking reactions. However, the selectivity of anhydride reaction decreases as the reaction temperature goes up. In order to achieve a selective reaction profile, therefore, the anhydride addition reaction ought advantageously to be carried out as far as possible at temperatures below 150° C. For the reasons set out above, it is advantageous as far as possible to use the polycarboxylic acids in the form of their anhydrides.

This terminal OH group can be further reacted, furthermore, wholly or partly, with ester-forming phosphorus compounds to give phosphoric esters. The reaction with these phosphorylating agents may be performed in accordance with methods that are known per se, as described for example in Houben-Weyl, Methoden der Organischen Chemie, 4th Edition, Volume XII/2, pages 143-210 (1963) and in U.S. Pat. No. 4,183,766. An ester-forming phosphorus compound is a phosphorus compound which is able to form phosphoric esters by reaction with a hydroxy compound. Examples of ester-forming phosphorus compounds that can be used include phosphorus oxychloride, phosphorus pentoxide, polyphosphoric acid and acetyl phosphate. Further examples are described in DE-A-27 26 854. Phosphorus pentoxide and polyphosphoric acid are preferred.

Depending on the nature of the phosphorylating reagent used and on the stoichiometric amount of phosphorylating reagent used with respect to the component for phosphorylation, monoesters or diesters or else mixtures of both species are formed. Monoesters form predominantly with polyphosphoric acid, and mono/diester mixtures with phosphorus pentoxide. The monoesters are preferred. It is also possible to use a mixture of different components for phosphorylation in the phosphorylation reaction.

As the person skilled in the art is aware, alongside the phosphoric monoesters there may be formation of fluctuating amounts of pyrophosphoric and polyphosphoric esters as primary products, if polyphosphoric acids—in particular, polyphosphoric acids with relatively high degrees of condensation—are employed in excess (cf. Houben-Weyl, Volume XII/2, p. 147). These primary products may undergo hydrolysis with water, which is present therein for reasons including the hygroscopicity of powderous solids.

The reaction of the abovementioned ester-forming phosphorus compounds with the hydroxy compounds takes place preferably without solvents at temperatures up to about 120° C. Alternatively the reaction can be carried out in the presence of suitable inert solvents, as described for example in EP-A-193 019. The amount of the phosphorus compound used depends on the desired degree of phosphorylation.

The resultant phosphoric esters and the sulphonic and phosphonic acid adducts and acidic carboxyl compounds described earlier on above are capable of salt formation by virtue of their remaining acid groups. In the sense of the invention they can also be used in the form of such salts. These salts are obtained from the resultant reaction product by complete or incomplete neutralization with organic or inorganic bases. Examples of such organic bases are primary, secondary and tertiary amines and also amino alcohols, such as mono-, di- or tri-($C_1$-$C_6$ alkyl)amines, e.g. tri-methylamine, triethylamine, diethylamine, dipropyl-amine, dibutylamine or mono-, di- or tri-($C_1$-$C_4$ alkanol)amines, e.g. ethanolamine, diethanolamine, tri-ethanolamine, dimethylethanolamine, diethylethanolamine, dibutylethanolamine and 2-amino-2-methyl-1-propanol.

Examples of inorganic bases are ammonia, NaOH, KOH, LiOH, magnesium hydroxide and calcium hydroxide.

Through the choice of base used and the degree of neutralization it is possible to adjust the water solubility of the compounds of the invention.

A further representative of compounds which find use as Z—(NHR)$_m$ with m=1 are aminoalkoxysilanes such as, for example, (3-aminopropyl)trimethoxysilane, (3-amino-propyl)triethoxysilane, p-aminophenyltriethoxysilane, 4-aminobutyltriethoxysilane, 4-aminobutyldimethylmethoxysilane, 3-aminopropylmethyldiethoxysilane, (N-cyclohexylaminomethyl)methyldiethoxysilane, (N-cyclohexylaminomethyl)triethoxysilane, (N-phenyl-aminomethyl)methyldimethoxysilane and (N-phenylaminomethyl)trimethoxysilane and bis[3-(triethoxysilyl)propyl]-amine. These compounds can be also used as mixtures. The terminal alkoxy groups can be hydrolysed in water or aqueous media, so that hydroxy functionalities are formed.

The compounds of the formula Z—(NHR)$_m$ with m=2 are preferably aliphatic, aromatic and araliphatic primary diamines, such as ethylenediamine, neopentanediamine, 1,2- and 1,3-propanediamine, 1,4-butanediamine, 1,5-pentanediamine, 2-butyl-2-ethyl-1,5-pentanediamine, 1,6-hexamethylenediamine (also as a solution in water), 1,8-octamethylenediamine, 1,12-dodecamethylenediamine, cyclohexyldiamine, 4,4'-diaminodicyclohexylmethane, 3,3'-dimethyl-4,4'-diaminodicyclohexylmethane, isophoronediamine, 4,7-dioxadecane-1,10-diamine, 4,11-dioxatetradecane-1,14-diamine, 4,7,10-trioxadecane-1,13-diamine, polyoxyalkylenediamines which contain ethylene oxide and/or propylene oxide groups, arranged randomly or blockwise, which possess a number-average molecular weight of 148 to 4000 g/mol and which are available for example as Jeffamine® D 230, D 400, D 2000, D 4000 and Jeffamine® ED 600, ED 900, ED 2003 and EDR 148 from Huntsman, polytetrahydrofurandiamines such as bis(3-aminopropyl)polytetrahydrofuran 350, 750, 1100 and 2100 (the numbers indicate the approximate molecular weight) for example, 4,4'-diaminodiphenylmethane, 3,3'-diaminodiphenyl sulphone and also para- and meta-xylylenediamine. It is also possible to use polysiloxanes such as α,ω-bis-(aminoalkyl)polydialkylsiloxanes, preferably α,ω-bis(aminoalkyl)polydimethylsiloxanes, which are available for example as aminopropyl-terminated, linear siloxanes from Chisso Corporation as FM-3311 or FM-3321 and from Clariant as Clariant LSM 66M9 or Clariant LSM 66M13, having number-average molecular weights Mn of 400 to 10 000 g/mol, preferably 500 to 5000 g/mol.

As representatives of compounds of the formula Z—(NHR)$_m$ with m=3 mention may be made by way of example of polyoxypropylenetriamines, known under the brand names Jeffamineo T 403, T 3000 and T 5000 from Huntsman (the numbers indicate the approximate molecular weight), or 4-aminomethyl-1,8-octanediamine.

In the reaction with the difunctional or trifunctional compounds of the formula (II), preferably 0% to 50% and more preferably 0% to 25% of the uretdione groups originally employed are reacted. Particularly preferred products are obtained entirely without use of difunctional or trifunctional compounds of the formula (II).

To prepare the addition compounds of the invention it is also possible to use mixtures of different starting materials such as mixtures of uretdione-containing polyisocyanates, and/or compounds of formula (I) and/or (II).

The preparation of the addition compounds of the invention can be carried out, in analogy to the prior art, according to viscosity, in bulk or in the presence of suitable solvents, solvent mixtures or other suitable carrier media. Suitable solvents or carrier media are all those which are not reactive or whose reactivity towards the coreactants is negligible and in which the reactants and the reaction products are at least partly soluble, examples being hydrocarbons such as toluene, xylene, aliphatic and/or cycloaliphatic benzine fractions, chlorinated hydrocarbons such as chloroform, trichloroethane, cyclic and acyclic ethers such as dioxane, tetrahydrofuran, polyalkylene glycol dialkyl ethers, esters such as ethyl acetate, butyl acetate, butyrolactone, phthalates or other plasticizers, di- or polycarboxylic esters, dialkyl esters of $C_2$ to $C_4$ dicarboxylic acids, referred to as "Dibasic Ester", alkyl glycol esters such as ethyl glycol acetate, methoxypropyl acetate, ketones such as methyl isobutyl ketone, cyclohexanone, acetone, acid amides such as dimethylformamide, N-methylpyrrolidone, and so on. The solvent or solvents and/or carrier media are advantageously selected to take account of the planned field of use. For example, for addition compounds of the invention for use in water-thinnable coating systems, or for coating pigments in aqueous suspension following the pigment synthesis, it is advantageous to use solvents which are totally or partly water-dilutable. Where the products are to be used, for example, in applications where the presence of VOCs (volatile organic compounds) is unwanted, the formulation should as far as possible be solvent-free or take place in appropriately high-boiling carrier media.

Depending on the field of application it is possible for the solvents used for the synthesis to remain in the reaction mixture, or they are fully or partly removed and, where appropriate, replaced by other solvents or carrier media. Depending on compatibility the addition compounds of the invention can also be combined with resins, resin solutions, reactive diluents, binders or other prior art additives, such as other wetting agents and dispersants, anti-settling agents, surface-active additives such as silicones, for example, and so on. Thus, for example, the development of floating phenomena such as Benard cells can be suppressed by combining the addition compounds of the invention with surface-active silicone compounds.

The solvent can be removed, for example, by distillation, where appropriate under reduced pressure, and/or azeotropically with the addition of water, such removal being complete or partial. Alternatively the active substance can be isolated by precipitation, by the addition of non-solvents such as aliphatic hydrocarbons, hexane for example, subsequent separation by filtration, and drying if desired. The active substance obtained by one of these methods can then be diluted in a solvent suitable for the particular field of application, or where appropriate can be used as it is, in the case of powder coating materials for example. If desired, following the addition of suitable high-boiling solvents, the solvent in which the addition product is dissolved can be distilled off, where appropriate under reduced pressure, and/or azeotropically with addition of water. In this way the addition product can be transferred to a carrier medium that is suitable for the respective field of application.

The reactions can be carried out in the presence of customary catalysts, examples being organotin compounds, such as dibutyltin dilaurate, other organometallic compounds such as iron acetylacetonate, tertiary amines such as triethylenediamine, enzymes or the like.

By varying the substituents of the formula (I), the nature, proportions and/or molecular weights thereof, it is possible to adapt the properties of the addition compounds of the invention to the different fields of application. For example, the solubility and compatibility can be brought into line with a very wide variety of solvents, carrier media, binders, resins, solids and, where appropriate, further polymeric compounds that are present in coating and moulding materials in which the addition compounds according to the invention are employed.

For use in highly polar systems such as water-based coating materials and electrocoats, for example, the radicals Y ought to include a sufficiently high fraction of polar groups, such as polyethylene oxides, for example, in order to achieve a level of water solubility which is sufficient for the particular area of use. This fraction of hydrophilic groups ought also not to be too high, however, if in certain applications this results in an unwanted increase in the sensitivity to water.

In the case of use in apolar systems such as long-oil alkyd paints, PVC plastisols or polyolefins there should be an appropriate fraction of apolar groups, and in the case of use in systems where broad compatibility is important, such as pigment concentrates, for example, a balanced combination of polar and apolar groups is of advantage.

For dispersing in silicone oils such as decamethylcyclopentasiloxane, for example, for cosmetic preparations for example, polydimethylsiloxane-containing addition compounds in particular are suitable. If the addition compounds are used, for example, in a polyurethane resin or in a coating material whose binder is a polyurethane it is advantageous to use those addition compounds of the invention whose molecule, by virtue of the groups present in the starting compounds of the formula (I), also includes urethane groups or similar groups which, as is known to the skilled person, are compatible with polyurethanes. The same applies, mutatis mutandis, to, for example, polyacrylates, polyesters, alkyd resins, etc.

Mutatis mutandis this also applies to the substituents of the formula (II), which exert particular influence over the affinity of the addition compounds of the invention for the solids used that are to be dispersed. Biuret adducts with acidic functional groups such as COOH, $SO_3H$ and $PO_3H_2$ or addition compounds containing phosphoric esters can be used for stabilizing solids which possess a basic character, especially inorganic pigments and fillers such as $TiO_2$, iron oxide, $CaCO_3$ or aluminium hydroxide, for example. For the stabilization of organic pigments such as Hostapermblau BT 729D in aqueous systems, biuret compounds with nonionic groups are particularly suitable. Alkoxysilane-containing adducts are especially suitable for hydroxyl-containing surfaces such as quartz or glass fibres, with which they react and, in so doing, enter into a particularly strong bond, and are therefore also able to bring about improvements in adhesion and mechanical properties, especially in combination with co-crosslinkable radicals Y with for example acrylic groups.

Addition compounds of the invention with surface-active substituents may modify the surface tension of the substrates produced using them. If, for instance, very apolar groups such as long-chain alkyl groups having more than 12 C atoms, polydimethylsiloxane-containing and/or perfluoroalkyl-containing groups are present, for example, the products are suitable for reducing the surface tension of liquid organic or aqueous systems or of solid systems, and for influencing the associated properties such as, for example, wetting properties, stainability, printability, flow and foam behaviour. In systems which exhibit reactivity with double bonds, such as radiation-curing coatings, such as UV-curing or electron-beam-curing paints and printing inks, or unsaturated polyester systems, for example, co-crosslinking can be achieved through the use of addition compounds of the invention containing unsaturated groups, and leads to improvements in adhesion, incorporation of solids, mechanical properties and migration behaviour. In applications where the presence of double bonds leads to unwanted disadvantages such as discoloration, as a result for example of high processing temperatures, it is advantageous to use addition compounds of the invention with as few unsaturated groups as possible and preferably none at all.

The average molecular weight of the addition compounds of the invention is at least advantageously 500 g/mol, preferably 800 g/mol, more preferably 1200 g/mol and very preferably 2000 g/mol.

The invention also provides a process for preparing the addition compounds of the invention, which involves (A) reacting
  (a) one or more polyisocyanates containing uretdione groups with
  (b) one or more compounds of the formula (I)

$$Y\text{—}(XH)_n \qquad (I)$$

where
    XH is a group that is reactive towards isocyanates and
    Y is a monomeric or polymeric organic group that is not reactive towards isocyanates and that comprises one or more aliphatic, cycloaliphatic, araliphatic and/or aromatic groups,
    Y possessing a number-average molar mass of less than 20 000 g/mol, and
    n is 1, 2 or 3, and
    for at least 50 mol % of the compounds of the formula (I) it is the case that n=1,
    with the proviso that at least 50% of the free isocyanate groups of component (a) are reacted with the compounds of the formula (I) to give an intermediate which contains uretdione groups,
(B) reacting the intermediate with
  (c) one or more compounds of the general formula (II)

$$Z\text{—}(NHR)_m \qquad (II)$$

in which
    R is hydrogen, an aliphatic, cycloaliphatic, araliphatic and/or aromatic radical having up to 36 C atoms, or a polyoxyalkylene radical,
    m is 1, 2 or 3 and
    Z is a non-basic aliphatic, cycloaliphatic, araliphatic and/or aromatic radical and/or polyoxyalkylene or polysiloxane radical having a number-average molar mass of less than 10 000 g/mol, which if desired may contain the following functional groups:
      —OH
      —COOH
      —$SO_3H$
      —$PO_3H_2$
      —$Si(OR)_3$ and —$SiR(OR)_2$, and
(C) optionally reacting hydroxyl groups present in the reaction product with polyphosphoric acid or $P_2O_5$ or with polycarboxylic acids having at least two carboxyl groups or their anhydrides in an amount such that for each OH group to be reacted there is at least 0.8 molecule of polycarboxylic acid or polycarboxylic anhydride employed, and;
(D) optionally reacting the addition compounds with organic or inorganic bases
  with the proviso that all free NCO groups that may still be present and at least 20% of the uretdione groups used originally are reacted with Z—$(NHR)_m$.

The invention further provides for the use of the above-described addition compounds of the invention as dispersants and as dispersion stabilizers.

The invention further provides pulverous or fibrous solids intended for incorporation into liquid systems and coated with these addition compounds as dispersants and as dispersion stabilizers.

The addition compounds of the invention can be used in accordance with the prior art for known dispersants, using the dispersants according to the invention in place of their prior art counterparts. Thus, for example, they can be used in the preparation or processing of paints, printing inks, inkjet inks, paper coatings, leather and textile colours, pastes, pigment concentrates, ceramics, cosmetic preparations, particularly if they contain solids such as pigments and/or fillers. They can also be employed in connection with the preparation or processing of casting and/or moulding compositions based on synthetic, semi-synthetic or natural macromolecular substances, such as polyvinyl chloride, saturated or unsaturated polyester, polyurethane, polystyrene, polyacrylate, polyamide, epoxy resins, polyolefins such as polyethylene or polypropylene, for example. By way of example it is possible to use the addition compounds for preparing casting compositions, PVC plastisols, gelcoats, polymer concrete, printed circuit boards, industrial paints, wood and furniture varnishes, vehicle finishes, marine paints, anti-corrosion paints, can coatings and coil coatings, decorating paints and architectural paints, where binders and/or solvents, pigments and optionally fillers, the addition compound, and typical auxiliaries are mixed. Examples of typical binders are resins based on polyurethane, cellulose nitrate, cellulose acetobutyrate, alkyd, melamine, polyester, chlorinated rubber, epoxide and acrylate. Examples of water-based coatings are cathodic or anodic electrodeposition coatings for car bodies, for example. Further examples are renders, silicate paints, emulsion paints, aqueous paints based on water-thinnable alkyds, alkyd emulsions, hybrid systems, 2-component systems, polyurethane dispersions and acrylate dispersions.

The addition compounds of the invention are particularly suitable as well for preparing concentrates of solids, such as pigment concentrates, for example. For that purpose the compounds of the invention are initially introduced in a carrier medium such as organic solvents, plasticizers and/or water, and the solids to be dispersed are added with stirring. Additionally these concentrates may include binders and/or other auxiliaries. With the addition compounds of the invention, however, it is possible in particular to prepare stable binder-free pigment concentrates. It is also possible using the compounds of the invention to prepare fluid concentrates of solids from pigment presscakes. In this case the compound of the invention is admixed to the presscake, which may additionally contain organic solvents, plasticizers and/or water, and the resulting mixture is dispersed. Prepared in their different ways, the concentrates of solids can then be incorporated into different substrates such as, for example, alkyd resins, polyester resins, acrylate resins, polyurethane resins or epoxy resins. Pigments can also, however, be dispersed directly in the addition compounds of the invention, without solvent, and are then particularly suitable for pigmenting thermoplastic and thermoset polymer formulations.

The addition compounds of the invention can be also be used with advantage in connection with the production of colour filters for liquid-crystal displays, liquid-crystal screens, colour resolution devices, sensors, plasma screens, displays based on SED (Surface conduction Electron emitter Display) and for MLCC (Multi-Layer Ceramic Compounds). The MLCC technology is used in connection with the production of microchips and printed circuit boards.

The addition compounds of the invention can also be used to produce cosmetic preparations such as, for example, makeup, powder, lipsticks, hair colorants, creams, nail varnishes and sun protection products. These may be present in the customary forms, as for example W/o or O/W emulsions, solutions, gels, creams, lotions or sprays. The addition compounds of the invention can be used with advantage in dispersions that are used for preparing these preparations. These dispersions may contain the carrier media that are typical for these purposes in cosmetology, such as, for example, water, castor oils or silicone oils, and solids, such as organic and inorganic pigments such as titanium dioxide or iron oxide, for example.

The invention also provides, finally, for the use of such a dispersant for producing a pigmented coating on a substrate, the pigmented paint being applied to the substrate and the pigmented paint which has been applied to the substrate being baked or cured and/or crosslinked.

The addition compounds can be used alone or together with customary prior art binders. For use in polyolefins, for example, it can be advantageous to use corresponding polyolefins of low molecular mass as carrier materials, together with the addition compounds.

One inventive use of the addition compounds is in the preparation of dispersible solids in powder particle and/or fibre particle form, particularly of dispersible pigments or plastics fillers, the particles being coated with the addition compounds. Coatings of this kind of organic and inorganic solids are performed in a known way, as described in EP-A-0 270 126, for example. In this case the solvent or emulsion medium can either be removed or remain in the mixture, with the formation of pastes. These pastes are customary commercial products and may additionally include binder fractions and also further auxiliaries and additives. Specifically in the case of the pigments it is possible for the pigment surface to be coated during or after the synthesis of the pigments, by the addition, for example, of the addition products of the invention to the pigment suspension or during or after the pigment finish. The pigments pretreated in this way are distinguished by greater ease of incorporation and also by improved viscosity, flocculation and gloss behaviour and by higher colour strength as compared with untreated pigments.

Besides the above-described application, as dispersants and/or coating materials for pulverous and fibrous solids, the addition compounds of the invention can also be used as viscosity reducers and compatibilizers in synthetic resins or for improving the compatibility of mixtures of incompatible components, such as polymer mixtures, for example. Examples of such synthetic resins are those known as sheet moulding compounds (SMC) and bulk moulding compounds (BMC), which are composed of unsaturated polyester resins with high filler and fibre contents. Their preparation and processing are described by way of example in DE-A-36 43 007. One problem affecting SMC and BMC synthetic resin mixtures is that often polystyrene (PS) is added to the formulation in order to reduce contraction during the processing operation. PS is not compatible with the unsaturated polyester resins used, and separation of the components occurs. When PS-filled SMC or BMC mixtures are being used, the additives of the invention, by virtue of their good dispersing qualities, are able to bring about compatibilization between PS and unsaturated polyester resin, thereby increasing the storage stability and processing reliability of such mixtures.

A further example are incompatible polyol mixtures, polyisocyanate mixtures or polyol/blowing agent mixtures used for polyurethane production. Through the addition compounds of the invention it is possible in many cases wholly or partly to prevent the separation problems which result from this incompatibility.

Depending on the field of use, the addition compounds of the invention are added typically in amounts of 0.01% to 10%, based on the total amount. Based on the solid to be dispersed, they are used in an amount of preferably 0.5% to 100% by weight. Where difficult-to-disperse solids are used, the amount of inventive addition compound employed may well be higher. The amount of dispersant is generally dependent on the surface that is to be coated of the substance that is to be dispersed. For example, if titanium dioxide is used as a pigment, the amount of dispersant is lower than in the case of, say, carbon black. Generally speaking, the amount of dispersant needed to disperse inorganic pigments is less than for organic pigments, since the latter have a higher specific surface area and, consequently, a greater amount of dispersant is needed. Typical dosages for inorganic pigments are 1-10%, for organic pigments 10-30% (in each case expressed as active substance of addition compound relative to pigment). In the case of very finely divided pigments (e.g. some carbon blacks), amounts of 30-80% or more need to be added, even. As a criterion of sufficient pigment stabilization it is possible for example to employ colour strength, gloss and transparency of the pigment dispersion or the degree of floating (rubout test) in the case of a white reduction. The dispersing of the solids may take place as a single dispersion or else as a mixed dispersion with two or more pigments simultaneously, the best results generally being achievable with single dispersions. When mixtures of different solids are used, opposing charges on the surfaces of the solids may result in an increased incidence of agglomeration in the liquid phase. In these cases it is frequently possible, using the addition compounds of the invention, to achieve a charge of equal sign, generally a positive charge, for all of the particles and hence to avoid instabilities due to charge differences. The dispersants achieve their optimum effect when added to the millbase, particularly if first of all the solid to be dispersed is mixed only with the additive and, where appropriate, solvents ("premix"), since in that case the additive is able to adsorb preferentially onto the surface of the solid, without having to compete with the binder polymers. In practice, however, this procedure is necessary only in exceptional cases. If necessary, the addition compounds can also be employed subsequently (as what are called "post-additives"), in order, for example, to solve floating or flocculation problems in a batch which has already been let down. Generally speaking, however, increased dosages of additive are necessary in this case.

In certain cases the addition compounds of the invention may exert a more or less pronounced influence on the rheology of the system. In such cases, therefore, they can also be used for rheology control, where appropriate in combination with other rheological additives such as fumed silica, phyllosilicates (bentonites), hydrogenated castor oils, BYK®-410, BYK®-420, BYK®-425 (BYK Chemie GmbH). In these cases, synergistic effects are frequently observed. In many cases it is also possible to improve the corrosion control properties of coatings through the use of the addition compounds of the invention.

Examples of pulverous or fibrous solids are those which have been coated with dispersants in accordance with the prior art, especially organic and inorganic pigments which are used in paints, coating materials, moulding compositions or other plastics, and organic or inorganic fillers which are used to fill or reinforce paints, coating materials, moulding compositions or other plastics. A subgroup of such fillers are fibres of organic and/or inorganic type which are likewise used as fillers or reinforcing substances.

Examples of pigments are mono-, di-, tri- and poly-azo pigments, oxazine, dioxazine and thiazine pigments, diketopyrrolopyrroles, phthalocyanines, ultramarine and other metal complex pigments, indigoid pigments, diphenylmethane, triarylmethane, xanthene, acridine, quinacridone and methine pigments, anthraquinone, pyranthrone, perylene and other polycyclic carbonyl pigments, inorganic pigments based on carbon black, graphite, zinc, titanium dioxide, zinc oxide, zinc sulphide, zinc phosphate, barium sulphate, lithopones, iron oxide, ultramarine, manganese phosphate, cobalt aluminate, cobalt stannate, cobalt zincate, antimony oxide, antimony sulphide, chromium oxide, zinc chromate, mixed metal oxides based on nickel, bismuth, vanadium, molybdenum, cadmium, titanium, zinc, manganese, cobalt, iron, chromium, antimony, magnesium, aluminium (for example nickel titanium yellow, bismuth vandate molybdate yellow or chromium titanium yellow), magnetic pigments based on pure iron, iron oxides and chromium oxides or mixed oxides, metallic pigments comprising aluminium, zinc, copper or brass, and also pearlescent pigments, and fluorescent and phosphorescent luminescent pigments.

Further examples are nanoscale organic or inorganic solids having particle sizes below 100 nm, such as certain grades of carbon black, or particles composed of a metal or semimetal oxide or hydroxide, and also particles composed of mixed metal and/or semimetal oxides and/or hydroxides. By way of example it is possible to employ the oxides and/or oxide hydroxides of aluminium, silicon, zinc, titanium, etc. in order to prepare extremely finely divided solids of this kind. These oxidic or hydroxidic or oxide-hydroxidic particles may be prepared by any of a wide variety of methods such as, for example, ion-exchange operations, plasma operations, sol-gel processes, precipitation, comminution (by grinding, for example) or flame hydrolysis, etc.

Examples of pulverous or fibrous fillers are, for example, those composed of pulverous or fibrous particles of aluminium oxide, aluminium hydroxide, silicon dioxide, kieselguhr, siliceous earth, quartz, silica gel, talc, kaolin, mica, perlite, feldspar, slate flour, calcium sulphate, barium sulphate, calcium carbonate, calcite, dolomite, glass or carbon. Further examples of pigments or fillers are found for example in EP-A-0 270 126. Additionally flame retardants such as, for example, aluminium hydroxide or magnesium hydroxide, and matting agents such as silicas, for example, can likewise be dispersed and stabilized outstandingly.

EXAMPLES

In the text below the invention is illustrated by means of examples. In the case of substances lacking molecular uniformity the molecular weights indicated below represent average values of the numerical mean (which, moreover, applies to the entire description, unless otherwise noted). The molecular weights, and number-average molecular weights Mn, can be determined by standard methods, as for example by determining the OH number or the amine number, cryoscopically, or by gel permeation chromatography. Unless otherwise remarked, parts are parts by weight and percentages are percentages by weight. The free NCO content of the polyisocyanates employed and also the course of the NCO addition reactions are determined in accordance with EN ISO 9369 by reaction with butylamine and subsequent titration of the amine excess. These methods are also described in Saul Patai's "The Chemistry of Cyanates and their Thio Derivatives", Part 1, Chapter 5, 1977. The polyphosphoric acid used has an 85% $P_4O_{10}$ content.

Preparation of the Intermediates (=Products of the Reaction Between Uretdione-Containing Polyisocyanates and Compounds of the Formula (I))

Preparation of Intermediate I1 a) Caprolactone polyester (compound of the formula (I); average molecular weight Mn of 1200 g/mol):

Under an inert atmosphere 20.1 parts of hexadecanol and 79.9 parts of ε-caprolactone are homogenized, 0.002 part of dibutyltin dilaurate is added and the mixture is heated to 160° C. It is stirred at this temperature until a solids content of 98% is reached. The resulting polyester has an OH number of 47.

stirred at 80° C. until the NCO content has fallen to <0.1%.

Immediately after their preparation the intermediates thus obtained can be reacted further, as described below, with amino-functional compounds. Since preferably they no longer contain any free NCO groups they are storage-stable and can therefore also be stored, instead of the direct further reaction, over any desired period of time, to be used later. The polyesters are prepared as described under intermediate I1a).

TABLE 1

Intermediates

| No. | Polyisocyanate | Parts by weight | Component 1 Compound of the formula (I) | Parts by weight | Component 2 Compound of the formula (I) | Parts by weight | NCO conversion in % |
|---|---|---|---|---|---|---|---|
| I1 | P1 | 21.4 | C16 CPE 1200 | 39.7 | MPEG 500 | 38.9 | 30/70 |
| I2 | P1 | 15.8 | EO/PO 1100 | 72.7 | M350 CPE 700 | 11.5 | 80/20 |
| I3 | P2 | 8.5 | EO/PO 2000 | 91.5 | | | 100/– |
| I4 | P2 | 17.5 | C10 CPE 700 | 40.3 | PO 1100 | 42.2 | 60/40 |
| I5 | P3 | 31.5 | M500 CPE 900 | 63.7 | n-decanol | 4.8 | 70/30 |
| I6 | P1 | 14.8 | EO/PO 1100 | 85.2 | | | 100/– |
| I7 | P1 | 11.8 | EO/PO 1400 | 88.2 | | | 100/– |
| I8 | P1 | 10.1 | EO/PO 1700 | 89.9 | | | 100/– |
| I9 | P1 | 19.8 | C10 CPE 1000 | 50.1 | PEG 600 | 30.1 | 50/50 |
| I10 | P1 | 25.6 | Monophenyl glycol | 9.4 | PEG 1000 | 65.0 | 50/50 |
| I11 | P1 | 12.2 | EO/PO 1700 | 54.4 | Jeffamine M1000 | 33.4 | 50/50 |
| I12 | P1 | 9.0 | C10 CVPE 2000 | 91.0 | | | 100/– |
| I13 | P1 | 24.4 | C4 CPE 600 | 75.6 | | | 100/– |
| I14 | P1 | 13.8 | C16 CPE 1200 | 86.2 | | | 100/– |
| I15 | P1 | 13.8 | C4 CPE 1200 | 86.2 | | | 100/– |
| I16 | P1 | 24.4 | C16 CPE 600 | 75.6 | | | 100/– |
| I17 | P1 | 21.4 | MPG-CPE 1200 | 86.2 | | | 100/– |
| I18 | P1 | 8.8 | EO/PO 1700 CPE 2000 | 91.2 | | | 100/– |
| I19 | P1 | 24.4 | HEA-CPE 600 | 75.6 | | | 100/– |
| I20 | P1 | 13.8 | PDMS 1200 | 86.2 | | | 100/– |

Key to Table 1:
P1 = Aliphatic HDI uretdione having a free NCO content of 21.8%, e.g. Desmodur N3400, Bayer AG
P2 = Aromatic TDI uretdione having a free NCO content of 22.95%, e.g. Desmodur TT/G, Rheinchemie
P3 = Aliphatic IDPI uretdione having a free NCO content of 13.5%, e.g. Crelan VP LS 2147, Bayer AG G16 CPE 600, 1200 = Monohydroxy-functional ε-caprolactone polyester, prepared starting from hexadecanol, average molecular weight Mn = 600 or 1200 g/mol
C4 CPE 600, 1200 = Monohydroxy-functional ε-caprolactone polyester, prepared starting from n-butanol, average molecular weight Mn = 600 or 1200 g/mol
MPEG 500 = Methoxypolyethylene glycol, average molecular weight Mn = 500 g/mol
EO/PO 1100, 1700, 2000 = monohydroxy-functional EO/PO polyether (EO:PO 1:1) prepared starting from butanol, average molecular weight Mn = 1100, 1700, 2000 g/mol
EO/PO 1400 = monohydroxy-functional EO/PO polyether (EO:PO 3:1) prepared starting from butanol, average molecular weight Mn = 1400 g/mol
M350 CPE 700 = ε-Caprolactone polyester prepared starting from MPEG 350, average molecular weight Mn = 700 g/mol
M500 CPE 900 = ε-Caprolactone polyester prepared 30 starting from MPEG 500, average molecular weight Mn = 900 g/mol
C10 CPE 700, 1000 = Monohydroxy-functional ε-caprolactone polyester, prepared starting from isodecanol, average molecular weight Mn = 700, 1000 g/mol
PO 1100 = Monohydroxy-functional PO polyether, average molecular weight Mn = 1100 g/mol
MPG-CPE 1200 = Monohydroxy-functional ε-caprolactone polyester prepared starting from monophenyl glycol, average molecular weight Mn 1200 g/mol
PEG 600, 1000 = Polyethylene glycol (dihydroxy-functional), average molecular weight Mn = 600 or 1000 g/mol
Jeffamine M 1000 = Monoamino-functional EO/PO polyether, (EO:PO 6:1), average molecular weight Mn = 1000 g/mol
C10 CVPE 2000 = Polyester of ε-caprolactone and δ-valerolactone in a molar ratio of 3:1, prepared starting from isodecanol, number-average molecular weight Mn = 2000 g/mol
EO/PO 1700 CPE 2000 = ε-Caprolactone polyester prepared starting from the EO/PO 1700 (monohydroxy-functional Mn 1700, see above), average molecular weight Mn = 2000 g/mol
HEA-CPE 600 = Monohydroxy-functional ε-caprolactone polyester prepared starting from hydroxyethyl acrylate, average molecular weight Mn = 1200 g/mol
PDMS 1200 = Monohydroxy-functional hydroxypropyl-polydimethylsiloxane, Mn = 1200 g/mol
In the case of I9 and I10 the PEG is used in excess, so that only approximately 50% of the OH groups present in the PEG are reacted with NCO.

b) Reaction of an aliphatic HDI uretdione with a) 21.4 parts of aliphatic HDI uretdione having an NCO content of 21.8% are stirred with 39.7 parts of the caprolactone polyester described under a), and 38.9 parts of methoxypolyethylene glycol 500 (Mn=500 g/mol) at about 80° C., with the addition of 0.01 part of dibutyltin dilaurate, until all of the free NCO groups have reacted and the presence of NCO is no longer detectable titrimetrically.

General Preparation Instructions for the Intermediates:

The stated polyisocyanate is mixed with the components stated in the table below. The mixture is then heated to 80° C., 0.01% of dibutyltin dilaurate is added, and the mixture is Preparation Example 1 of the Inventive Biuret Compounds A reaction vessel with reflux condenser and stirrer is charged with 48.8 parts of the uretdione-containing precursor intermediate I1 and this initial charge is heated to 90° C. As soon as this temperature is reached, 1.2 parts ethanolamine are added. The reaction may be somewhat exothermic, but does not require cooling; the energy liberated is used to accelerate the reaction. At the temperature which comes about, the reaction mixture is stirred until the uretdione addition reaction is largely at an end. The reaction can be monitored from the decrease in the amine number: >95% of the amino groups present are reacted. Subsequently the product is diluted with 50 parts of PMA (propylene glycol monomethyl ether acetate). The product thus obtained has a solids content of 50%.

General Preparation Instructions for the Preparation Examples Described in the Table Below:

The intermediate is introduced and if appropriate is diluted in a portion of the stated solvent, and heated. Primary amines and the amino alcohols are added at 90° C., secondary amines and amino alcohols at 140° C., and acid-functional amines at 105° C. The reaction may be somewhat exothermic, but does not require cooling; the energy liberated is utilized to accelerate the reaction. At the temperature which comes about, the reaction mixture is stirred until, on the basis of the decrease in the amine number, the uretdione addition reaction is largely at an end.

This can be followed by cooling and discharge.

Preparation Example 30

A reaction vessel with reflux condenser and stirrer is charged with 97.1 parts of the inventive biuret compound 1 and this initial charge is heated to 120° C. Following the addition of 0.005 part of para-toluenesulphonic acid, 2.9 parts of phthalic anhydride are added. The reaction may be somewhat exothermic, but does not require cooling; the energy that is liberated is utilized to accelerate the reaction. At the temperature which comes about, the reaction mixture is stirred until the addition reaction, on the basis of the decrease in the anhydride acid number and the attainment of an acid number of 11 mg KOH/g, is largely at an end.

This can be followed by cooling and discharge. The reaction product has a solids content of 51%.

TABLE 2

Preparation examples

| No. | Intermediate No. | % by wt. of intermediate | Amine | % by wt. of amine | Solvent | % by wt. | Solids content |
|---|---|---|---|---|---|---|---|
| 1 | I1 | 48.8 | 2-ethanolamine | 1.2 | PMA | 50 | 50 |
| 2 | I2 | 96.2 | PAB | 3.8 | — | | 100 |
| 3 | I3 | 78.2 | MAB | 1.8 | BG | 20 | 80 |
| 4 | I4 | 93.6 | AMMO | 6.4 | — | | 100 |
| 5 | I5 | 66.3 | aminoethanesulphonic acid | 3.7 | PM | 30 | 70 |
| 6 | I6 | 96.4 | octylamine | 3.6 | — | | 100 |
| 7 | I6 | 97.0 | benzylamine | 3.0 | — | | 100 |
| 8 | I7 | 98.4 | propanolamine | 1.6 | — | | 100 |
| 9 | I7 | 96.1 | dibenzylamine | 3.9 | — | | 100 |
| 10 | I7 | 97.1 | PAB | 2.9 | — | | 100 |
| 11 | I8 | 97.2 | benzylamine/dibenzylamine (50:50 mol %) | 1.0/1.8 | — | | 100 |
| 12 | I9 | 90.4 | (N-phenylaminomethyl)-Methyldimethoxysilane | 9.6 | PMA/PM (1:1) | 50 | 50 |
| 13 | I10 | 57.7 | 2-phenylethylamine | 2.3 | PMA | 40 | 60 |
| 14 | I11 | 96.3 | dibenzylamine | 3.7 | — | | 100 |
| 15 | I12 | 98.2 | benzylamine | 1.8 | — | | 100 |
| 16 | I13 | 90 | AMMO | 10 | | | 100 |
| 17 | I14 | 94 | AMMO | 6 | | | 100 |
| 18 | I15 | 94 | AMMO | 6 | | | 100 |
| 19 | I19 | 90 | AMMO | 10 | | | 100 |
| 20 | I13 | 92.7 | AMMO | 7.2 | | | 100 |
| 21 | I13 | 94.7 | AMMO | 5.3 | | | 100 |
| 22 | I17 | 93 | AMMO | 7 | | | 100 |
| 23 | I13 | 97 | 2-ethanolamine | 3 | | | 100 |
| 24 | I16 | 97 | 2-ethanolamine | 3 | | | 100 |
| 25 | I15 | 98.3 | 2-ethanolamine | 1.7 | | | 100 |
| 26 | I20 | 98.3 | 2-ethanolamine | 1.7 | | | 100 |
| 27 | I18 | 97.4 | 6-amino-1-hexanol | 2.6 | | | 100 |
| 28 | I16 | 96.3 | benzylamine/p-XDA (50:50 mol %) | 2.3/1.4 | | | 100 |

Key:
AMMO = (3-aminopropyl) trimethoxysilane
PAB = para-aminobenzoic acid
MAB = meta-aminobenzoic acid
PMA = propylene glycol 1-methylether acetate
BG = butyl glycol
PM = propylene glycol 1-methylether
p-XDA = para-xylylenediamine

Preparation Example 29

46.9 parts of the adduct obtained by preparation Example 23 are mixed with 3.1 parts of polyphosphoric acid and the mixture is stirred at 80° C. for 3 hours. It is then diluted with 50 parts of PMA. The liquid product thus obtained has a solids content of 50% and an acid number of 40 mg KOH/g.

Preparation Example 31

Non-Inventive Comparison Compound (Example from EP 1 453 875)
A reaction vessel with reflux condenser and stirrer is charged with 94.5 parts of a monohydroxy-functional polyether prepared starting from butanol, EO/PO 1400 (EO:PO=3:1, Mn=1400 g/mol) and this initial charge is heated to 70° C. Following the addition of 0.01 part of dibutyltin dilaurate, 5.5 parts of hexamethylene diisocyanate are added and the mixture is stirred at 80° C. until the presence of NCO is no longer detectable by titrimetry.

This can be followed by cooling and discharge. The reaction product has a solids content of 100%.

Preparation Example 32

47.1 parts of the adduct obtained by preparation Example 24 are mixed with 2.9 parts of polyphosphoric acid and the mixture is stirred at 80° C. for 3 hours. It is then diluted with 50 parts of PMA. The liquid product thus obtained has a solids content of 50% and an acid number of 34 mg KOH/g.

Preparation Example 33

48 parts of the adduct obtained by preparation Example 25 are mixed with 2 parts of polyphosphoric acid and the mixture is stirred at 80° C. for 3 hours. It is then diluted with 50 parts of PMA. The liquid product thus obtained has a solids content of 50% and an acid number of 27 mg KOH/g.

Preparation Example 34

48 parts of the adduct obtained by preparation Example 26 are mixed with 2 parts of polyphosphoric acid and the mixture is stirred at 80° C. for 3 hours. It is then diluted with 50 parts of PMA. The liquid product thus obtained has a solids content of 50% and an acid number of 25 mg KOH/g.

Use Examples

For the purpose of assessment of the compounds of the invention, binder-free pigment concentrates were prepared. After 7 days of storage at 20° C. their viscosity was evaluated at different shear rates. The lower the viscosity of the pastes, the better the dispersing outcome.

To prepare pigment concentrates of this kind, the weight fractions of raw materials indicated in the tables below are weighed out into a 100 ml double-walled Dispermat pot. An amount of glass beads 2 mm in diameter that is equal to the amount of raw material weighed out is added, and then dispersion is carried out using a 45 mm Teflon disc, with mains-water cooling.

In the case of the example pigments, Hostapermblau BT 729 (blue Cu phthalocyanine pigment from Clariant AG) and Hostapermrotviolett ER02 (red-violet quinacridone pigment from Clariant AG), the dispersing time is 30 minutes, in each case at a periphery speed (Teflon disc) of 23 m/s. After the paste has been cooled, the remaining water is incorporated with stirring.

The pastes thus dispersed are sieved off through a paper sieve (mesh size 80 pm) and dispersed into glass bottles. With the compounds of the invention, fluid pigment pastes are obtained which have very good Theological properties.

The viscosities of the pigment pastes were measured at 23° C. using the Stresstech rheometer, with the following parameters:

Cone-plate measurement system, cone 4 cm 1°; CSR measurement (upward and downward curve)

Paste Formulas:

| (Amounts figures in parts by weight) | | | | | | |
|---|---|---|---|---|---|---|
| Binder-free pastes | A1* | A2 | A3 | A4 | A5 | A6 |
| Water | 33 | 33 | 33 | 33 | 33 | 33 |
| Addition compound of preparation example | 6.5 | 6.5 | 6.5 | 6.5 | 6.5 | 6.5 |
| Byk ®-017 | 0.5 | 0.5 | 0.5 | 0.5 | 0.5 | 0.5 |
| Hostapermblau BT 729D | 25 | 25 | 25 | 25 | 25 | 25 |
| Water | 13 | 13 | 13 | 13 | 13 | 13 |
| Dispersing | | | | | | |
| Water | 22 | 22 | 22 | 22 | 22 | 22 |
| Total | 100 | 100 | 100 | 100 | 100 | 100 |
| Binder-free pastes | B1* | B2 | B3 | B4 | B5 | B6 |
| Water | 41.7 | 41.7 | 41.7 | 41.7 | 41.7 | 41.7 |
| Addition compound of preparation example | 7.8 | 7.8 | 7.8 | 7.8 | 7.8 | 7.8 |
| Byk ®-017 | 0.5 | 0.5 | 0.5 | 0.5 | 0.5 | 0.5 |
| Hostaperm-rotviolett 5R02 | 30 | 30 | 30 | 30 | 30 | 30 |
| Dispersing | | | | | | |
| Water | 20 | 20 | 20 | 20 | 20 | 20 |
| Total | 100 | 100 | 100 | 100 | 100 | 100 |

*not inventive
Byk ®-017: Silicone defoamer from BYK Chemie GmbH

Results:
Viscosities of pastes with Hostapermblau BT 729D pigment:

| Shear rate | 3/s | 10/s | 100/s | 1000/s |
|---|---|---|---|---|
| A1* Ex. No. 31 | 18 700 | 5390 | 414 | 56.2 |
| A2, Ex. No. 6 | 20.6 | 20.3 | 17.5 | 13.9 |
| A3, Ex. No. 9 | 44.6 | 41 | 29.6 | 17.5 |
| A4, Ex. No. 7 | 29.6 | 26.6 | 21.3 | 14.2 |
| AS, Ex. No. 10 | 14.7 | 15.9 | 13.6 | 11 |
| A6, Ex. No. 27 | 33.5 | 30.2 | 23.8 | 15.6 |

Viscosities of pastes with Hostapermrotviolett ER02 pigment:

| Shear rate | 3/s | 10/s | 100/s | 1000/s |
|---|---|---|---|---|
| B1* Ex. No. 31 | 27 800 | 6760 | 478 | 58.6 |
| B2, Ex. No. 6 | 108 | 92.9 | 59.3 | 35.3 |
| B3, Ex. No. 9 | 274 | 201 | 99.4 | 46.7 |
| B4, Ex. No. 7 | 114 | 94.1 | 59.6 | 33.3 |
| B5, Ex. No. 10 | 119 | 101 | 62.4 | 34.9 |
| B6, Ex. No. 27 | 123 | 104 | 65.7 | 36.2 |

Over the shear range tested, the pigment pastes A1 and B1 prepared with the non-inventive comparison compound exhibit the highest viscosities, particularly in the lower shear range, owing to their flocculation tendency, which is marked by deficient stabilization. The prepared pigment pastes A1 to A6 and B1 to B6 were blended with a 2-component polyurethane clearcoat, prepared according to the following formula, and the gloss units of the masstones were ascertained.
*2-component CPU Clearcoat:

|  | Parts by weight |
|---|---|
| Component A | |
| Setalux 6510 AQ-42 | 53.6 |
| demin. water | 10 |
| solvesso 100 (SN) | 1.3 |
| BYK ®-345 | 0.2 |
| BYK ®-333 | 0.2 |
| Component B | |
| Bayhydur 3100 | 11 |
| Bayhydur 2150/1 | 20.4 |
| Butylacetate | 2.6 |
| Butylglycol acetate | 1 |

Mixing ratio comp. A:comp. B = 65:35 by weight
Setalux 6510 AQ-42: polyacrylate polyol from AKZO (OH number = 4.2; solids = 41-43% in H₂O/butyl glycol)
Solvesso 100: aromatic hydrocarbon (C9 - C10) from ExxonMobil
BYK ®-345: Silicone surfactant from BYK Chemie GmbH
BYK ®-333: Silicone surface additive from BYK Chemie GmbH
Bayhydur 3100: Hydrophilic, aliphatic polyisocyanate based on hexamethylene diisocyanate, from BAYER MaterialScience (NCO content = 17.4 +/− 0.5%)
Bayhydur VP LS 2150/1: Water-dispersible polyisocyanate based on isophorone diisocyanate, from BAYER MaterialScience (NCO content = 9.4 +/− 0.5%)

The pastes are blended with the above clearcoat as follows:

(Amounts figures in parts by weight)

|  | MT 1-6 | MT 7-12 |
|---|---|---|
| Component A | 14 | 14 |
| Pigment paste A1-A6 | 2.2 | |
| Pigment paste B1-B6 | | 2.8 |
| Component B | 7.1 | 7.1 |
| Demin. water | 7.5 | 7.5 |

The blends were subsequently applied to a film by casting and were dried at room temperature for 7 days. The gloss units of masstones 1 to 12 were determined in accordance with DIN 67530 at an angle of 20° using the Byk-Gardner haze-gloss glossmeter.
Masstones with Hostapermblau BT 729D:

| MT | Gloss 20° |
|---|---|
| 1* | 74 |
| 2 | 78 |
| 3 | 76 |
| 4 | 80 |
| 5 | 77 |
| 6 | 77 |

Hostapermrotviollett ER02:

| MT | Gloss 20° |
|---|---|
| 7* | 80 |
| 8 | 93 |
| 9 | 89 |
| 10 | 100 |
| 11 | 95 |
| 12 | 90 |

*not inventive

The masstones MT 2 to 6 and MT 8 to 12 prepared with the compounds according to the invention show higher gloss values on account of their improved pigment stabilization as compared with the non-inventive comparision compound.

The invention claimed is:

1. An addition compound or mixture thereof, or a salt or salts thereof, produced by the process of reacting
   a) one or more polyisocyanates containing uretdione groups with
   b) one or more compounds of the formula (I)

$$Y—(XH)n \qquad (I)$$

where
   XH is a group that is reactive towards isocyanates and
   Y is a monomeric or polymeric organic group that is not reactive towards isocyanates and that comprises one or more aliphatic, cycloaliphatic, araliphatic and/or aromatic groups,
   Y possessing a number-average molar mass of at least 400 g/mol and less than 20 000 g/mol, and
   n is 1, 2 or 3, and
   for at least 75 mol % of the compounds of the formula (I), n shall equal 1,
   with the proviso that at least 50% of the free isocyanate groups of the polyisocyanate, component a), are reacted with the compounds of the formula (I) to give an intermediate which contains uretdione groups,
   and subsequently the intermediate is reacted with
   c) one or more compounds of the general formula (II)

$$Z—(NHR)m \qquad (II)$$

in which
   R is hydrogen, an aliphatic, cycloaliphatic, araliphatic and/or aromatic radical having up to 36 C atoms, or a polyoxyalkylene radical,
   m is 1, and
   Z is a non-basic aliphatic, cycloaliphatic, araliphatic and/or aromatic radical and/or polyoxyalkylene or polysiloxane radical having a number-average molar mass of less than 10 000 g/mol, which if desired may contain the following functional groups:
   —OH
   —COOH
   —SO₃H
   —PO₃H₂
   —Si(OR)₃ and —SiR(OR)₂
   where the hydroxyl groups are optionally further reacted with polyphosphoric acid or P₂O₅ or with polycarboxylic acids having at least two carboxyl groups or their anhydrides in an amount such that for each OH group to be reacted there is at least 0.8 molecule of polycarboxylic acid or polycarboxylic anhydride employed;
   with the proviso that all free NCO groups that may still be present and at least 20% of the uretdione groups used originally are reacted with Z—(NHR)m.

2. The addition compound, mixture thereof or salt or salts thereof according to claim 1, where XH represents the radicals —OH, —NH₂, —NHR, —SH or —COOH.

3. The addition compound, mixture thereof or salt or salts thereof according to claim 1 where Y optionally contains the heteroatoms O, S, Si and/or N and/or ether, urethane, carbonate, amide, siloxane and/or ester groups, and optionally halogen is substituted for hydrogen.

4. The addition compound, mixture thereof or salt or salts thereof according to claim 1, wherein Z has one or more of the following definitions:
A) linear, branched or cyclic alkyl group having 1 to 50 C atoms
B) an aromatic group which can be attached to the group NHR via an organic coupling group, or
C) radical of a polyalkylene oxide compound or
D) radical of an optionally polyether- and/or polyester-containing polysiloxane and optionally further containing —OH, —COOH, —SO$_3$H, —PO$_3$H$_2$, —Si(OR)$_3$ and/or —SiR(OR)$_2$ groups.

5. The addition compound, mixture thereof or salt or salts thereof according to claim 1, wherein R has one or more of the following definitions:
A) hydrogen, a C$_1$-C$_{36}$ alkyl radical, a C$_4$-C$_{36}$ cycloalkyl, a C$_6$-C$_{36}$ aryl or a C$_7$-C$_{36}$ aralkyl radical or
B) radical of a polyalkylene oxide compound having a number-average molar mass of 5000 g/mol and optionally being saturated or unsaturated.

6. A mixture of an addition compound according to claim 1, where at least two different compounds of the formula (I) are used.

7. The addition compound, mixture thereof or salt or salts thereof according to claim 1, wherein the addition compound contains no unsaturated groups.

8. The addition compound, mixture thereof or salt or salts thereof according to claim 1, wherein one or more of the compounds of the formula (I) used are hydroxy-functional polyethers, hydroxy-functional polyesters, hydroxy-functional polyether-polyesters and/or aliphatic and/or cycloaliphatic alcohols, some of whose hydrogen atoms may have been replaced by halogen and/or aryl radicals.

9. The addition compound, mixture thereof or salt or salts thereof according to claim 1, wherein the intermediate or intermediates containing uretdione groups are cyclic dimerization products of diisocyanates based on hexamethylene diisocyanate, isophorone diisocyanate and/or tolylene diisocyanate.

10. A method for the preparation of a paint or ink comprising combining at least one of the addition compounds of claim 1 and synthetic, semi-synthetic or natural macromolecular substances to produce a printing ink, a paper coating, a leather and textile colour, a pastes, a pigment concentrate, a ceramic or cosmetic preparation, a casting composition or a moulding composition or a combination thereof.

11. A method for the preparation of a concentrate, paint, paste or molding composition comprising combining at least one of the addition compounds of claim 1 with a pigment and/or a filler.

12. A pigmented paint comprising a combination of at least one of the addition compounds of claim 1, and a film-forming binder and/or solvent, and/or pigment and an optional filler and optional paint auxiliaries.

13. A method for preparing a pigmented coating on a substrate comprising applying the pigmented paint of claim 12 to the substrate and baking, curing or crosslinking the pigmented paint.

14. A method for preparation of a dispersible pigment or filler composition comprising applying at least one of the addition compounds of claim 1 to the surface of powder particles and/or fibre particles so as to coat the particles with the addition compound.

15. A process for preparing addition compounds, comprising
(A) reacting
(a) one or more polyisocyanates containing uretdione groups with
(b) one or more compounds of the formula (I)

$$Y—(XH)_n \qquad (I)$$

where
XH is a group that is reactive towards isocyanates and
Y is a monomeric or polymeric organic group that is not reactive towards isocyanates and that comprises one or more aliphatic, cycloaliphatic, araliphatic and/or aromatic groups,
Y possessing a number-average molar mass of at least 400 g/mol and less than 20 000 g/mol, and
n is 1, 2 or 3, and
at least 75 mol % of the compounds of the formula (I) have n equal to 1,
with the proviso that at least 50% of the free isocyanate groups of the polyisocyanate, component (a), are reacted with the compounds of the formula (I) to give an intermediate which contains uretdione groups,
(B) reacting the intermediate with
(c) one or more compounds of the general formula (II)

$$Z—(NHR)m \qquad (II)$$

in which
R is hydrogen, an aliphatic, cycloaliphatic, araliphatic and/or aromatic radical having up to 36 C atoms, or a polyoxyalkylene radical,
m is 1, and
Z is a non-basic aliphatic, cycloaliphatic, araliphatic and/or aromatic radical and/or polyoxyalkylene or polysiloxane radical having a number-average molar mass of less than 10 000 g/mol, which optionally may contain the following functional groups:
—OH
—COOH
—SO$_3$H
—PO$_3$H$_2$
—Si(OR)$_3$ and —SiR(OR)$_2$, and
(C) optionally reacting hydroxyl groups present in the reaction product with polyphosphoric acid or P$_2$O$_5$ or with polycarboxylic acids having at least two carboxyl groups or their anhydrides in an amount such that for each OH group to be reacted there is at least 0.8 molecule of polycarboxylic acid or polycarboxylic anhydride employed; and
(D) optionally reacting the addition compounds with organic or inorganic bases with the proviso that all free NCO groups that may still be present and at least 20% of the uretdione groups used originally are reacted with Z—(NHR)$_{mt}$.

* * * * *